United States Patent
Cheng et al.

(10) Patent No.: US 11,895,546 B2
(45) Date of Patent: Feb. 6, 2024

(54) PERFORMING MEASUREMENTS FOR A HANDOVER PROCEDURE IN A NON-TERRESTRIAL NETWORK

(71) Applicant: FG Innovation Company Limited, Tuen Mun (HK)

(72) Inventors: Chien-Chun Cheng, Taipei (TW); Yung-Lan Tseng, Taipei (TW); Hsin-Hsi Tsai, Taipei (TW); Hai-Han Wang, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 22 days.

(21) Appl. No.: 17/395,941

(22) Filed: Aug. 6, 2021

(65) Prior Publication Data

US 2022/0046498 A1 Feb. 10, 2022

Related U.S. Application Data

(60) Provisional application No. 63/062,766, filed on Aug. 7, 2020.

(51) Int. Cl.
*H04W 36/00* (2009.01)
*H04B 7/185* (2006.01)

(52) U.S. Cl.
CPC .... *H04W 36/0085* (2018.08); *H04B 7/18519* (2013.01)

(58) Field of Classification Search
CPC .......................... H04W 36/0085; H04B 7/18519
See application file for complete search history.

(56) References Cited

U.S. PATENT DOCUMENTS

2012/0300657 A1\* 11/2012 Jung ..................... H04W 76/15
                                                                 370/252
2018/0376393 A1\* 12/2018 Wu ........................... H04L 5/26
2019/0342801 A1\* 11/2019 Cui ....................... H04W 24/10
(Continued)

FOREIGN PATENT DOCUMENTS

CN      110831042 A      2/2020
CN      110859000 A      3/2020
(Continued)

OTHER PUBLICATIONS

Nokia, Nokia Shanghai Bell, "How to count carriers with different SMTC configuration from MN and SN", R4-1811119, 3GPP TSG-RAN WG4 Meeting #88, Gothenburg, Sweden, Aug. 20-24, 2018.
(Continued)

*Primary Examiner* — Rasheed Gidado
(74) *Attorney, Agent, or Firm* — ScienBiziP, P.C.

(57) ABSTRACT

A method for a user equipment (UE) connected to a serving cell associated with a first satellite is provided. The method receives a measurement configuration including a plurality of synchronization signal block (SSB) measurement timing configurations (SMTCs). Each SMTC may have at least one offset value and a first SMTC in the plurality of SMTCs has a first offset value that is different from a second offset value of a second SMTC of the plurality of SMTCs. The method further receives a signal to perform a measurement procedure for a second cell associated with a second satellite and performs the measurement procedure based on the received plurality of SMTCs.

16 Claims, 19 Drawing Sheets

(56) References Cited

U.S. PATENT DOCUMENTS

| | | | | |
|---|---|---|---|---|
| 2019/0393980 A1* | 12/2019 | Lin | ...................... | A01K 63/047 |
| 2020/0396704 A1* | 12/2020 | Dalsgaard | ............. | H04W 24/10 |
| 2021/0168745 A1* | 6/2021 | Harada | ............... | H04W 56/001 |
| 2021/0266854 A1* | 8/2021 | He | ................... | H04W 56/0015 |
| 2022/0039039 A1* | 2/2022 | Maattanen | .......... | H04W 56/001 |
| 2022/0263569 A1* | 8/2022 | Fan | .................... | H04B 7/18589 |

FOREIGN PATENT DOCUMENTS

| | | | |
|---|---|---|---|
| CN | 110972187 A | | 4/2020 |
| CN | 111148146 A | | 5/2020 |
| EP | 4040847 A1 | * | 8/2022 |
| WO | 2019/160266 A1 | | 8/2019 |

OTHER PUBLICATIONS

3rd Generation Partnership Project; Technical Specification Group Radio Access Network; NR; Radio Resource Control (RRC) protocol specification (Release 16); 3GPP TS 38.331 V16.1.0 (Jul. 2020).

3rd Generation Partnership Project; Technical Specification Group Radio Access Network; NR; Requirements for support of radio resource management (Release 16); 3GPP TS 38.133 V16.4.0 (Jun. 2020).

3rd Generation Partnership Project; Technical Specification Group Radio Access Network; Study on New Radio (NR) to support non-terrestrial networks (Release 15); 3GPP TR 38.811 V15.3.0 (Jul. 2020).

* cited by examiner

PERFORMING MEASUREMENTS FOR A HANDOVER PROCEDURE IN A NON-TERRESTRIAL NETWORK

CROSS-REFERENCE TO RELATED APPLICATION(S)

The present application claims the benefit of and priority to a provisional U.S. Patent Application Ser. No. 63/062,766, filed on Aug. 7, 2020, entitled "ENHANCEMENT ON PROPAGATION DELAY DIFFERENCE ON MEASUREMENT IN NTN,", the content of which is hereby incorporated fully by reference herein into the present application.

FIELD

The present disclosure generally relates to wireless communications, and more particularly, to enhancing measurement timing configuration for performing measurements in Non-Terrestrial Networks during a handover procedure.

BACKGROUND

With the tremendous growth in the number of connected devices and the rapid increase in user/network traffic volume, various efforts have been made to improve different aspects of wireless communication for the next-generation wireless communication system, such as the fifth generation (5G) New Radio (NR), by improving data rate, latency, reliability, and mobility. The 5G NR system is designed to provide flexibility and configurability to optimize the network services and types, accommodating various use cases, such as enhanced Mobile Broadband (eMBB), massive Machine-Type Communication (mMTC), and Ultra-Reliable and Low-Latency Communication (URLLC).

5G NR is envisioned to substantially improve the capability and efficiency in Non-Terrestrial Networks (NTNs). An NTN refers to a network, or segments of a network, that uses a spaceborne vehicle for data transmission, for example, using one or more Low Earth Orbiting (LEO) satellites and one or more Geostationary Earth Orbiting (GEO) satellites. The possible reference scenarios and architecture options for NTNs can be identified in the 3rd Generation Partnership Project (3GPP) specifications. For example, in 3GPP Release 17 (Rel-17) NTN working item (WI), the transparent payload-based LEO scenario is defined which addresses at least the 3GPP class 3 user equipment (UE) with Global Navigation Satellite System (GNSS) capability. Transparent payload-based LEO network (NW) may refer to a relay-based NTN. In such a case, the LEO satellites simply perform amplify-and-forward in space, and the base station (e.g., a gNB) is located on the ground and is connected to the core NW. An orbit of 600 km has been studied in the aforementioned WI.

GNSS may refer to a standard generic term for satellite navigation systems that provide autonomous geo-spatial positioning with global coverage. This term may include, for example, the Global Positioning System (GPS), GLObal NAvigation Satellite System (GLONASS), Galileo, Beidou, and/or other regional systems. The GNSS is usually operated on an orbit of 20200 km. FIG. 1 illustrates an LEO satellite 110 (e.g., having a distance of 600 km from the earth) and a GNSS satellite 120 (e.g., having a distance of 20200 km from the earth) in a transparent-payload deployment. In the figure, feeder link 130 may include a radio link between satellite 110 and the base station (e.g., gNB 140). Service link 150, on the other hand, may refer to a radio link between satellite 110 and UE 160. Lastly, satellite beam 170 may refer to a beam generated by an antenna onboard satellite 110. The diameter of satellite beam 170 may have a range of 50 km to 1000 km in some embodiments, which may impact the maximum differential delay among the in-service UEs (e.g., UE 160 and other UEs that are not shown in FIG. 1).

In 5G NR, for a procedure, such as a handover procedure (e.g., to switch to a stronger cell(s) or adding a new Carrier Component (CC) in a Carrier Aggression scenario), the serving cell and neighboring cell signals strength or signals quality matrix may be required to be measured. This requirement may enable the measurement process to be executed appropriately and substantially accurately to maintain the radio link quality (e.g., after the UE's handover to a new serving cell).

In LTE, a base station may continually transmit Cell-specific Reference Signal (CRS) to enable the UE to measure the cell quality of the neighboring cell(s). In 5G NR, however, the concept of CRS has been set aside in order to reduce the overhead and Reference Signal (RS) interference by other cells. Instead, 5G NR has introduced cell signal measurement by using Synchronizations Signal (SS)/Physical Broadcast Channel (PBCH) Block (SSB), which may have longer transmission periodicity (e.g., than the CRS). In NR, the number of SSBs in one burst may depend on the operating frequency. The SSB periodicity may be configured for each cell in the range of 5, 10, 20, 40, 80 or 160 milliseconds (ms). However, the UE may not need to measure the cell signals with periodicity, as the SSB and the appropriate measurement periodicity can be configured according to the channel condition. This is desirable and may help to avoid unnecessary measurements and may reduce the power consumption (e.g., at the UE side).

Based on the 3GPP specifications, an SSB-based measurement timing configuration (SMTC) window has to be signaled to the UE regarding the measurement periodicities and timings of SSB signals (e.g., that the UE uses for performing measurements). However, if the SMTC measurement gap configuration does not consider the propagation delay difference resulted from signal transmissions in an NTN, the UE may miss the SSB/CSI-RS measurement window and may thus be unable to perform proper (and/or accurate) measurements based on the configured reference signals.

SUMMARY

The present disclosure is directed to requesting a target SIB associated with a target service via a dedicated SIB request.

In a first aspect of the present application a method for a user equipment (UE) connected to a serving cell associated with a first satellite is provided. The method receives a measurement configuration including a plurality of synchronization signal block (SSB) measurement timing configurations (SMTCs). Each SMTC may have at least one offset value and a first SMTC in the plurality of SMTCs has a first offset value that is different from a second offset value of a second SMTC of the plurality of SMTCs. The method further receives a signal to perform a measurement procedure for a second cell associated with a second satellite and performs the measurement procedure based on the received plurality of SMTCs.

In an implementation of the first aspect, receiving the measurement configuration comprises receiving the measurement configuration from a base station through the serving cell.

In another implementation of the first aspect, the measurement procedure is performed for a handover procedure to move from the serving cell to the second cell.

In another implementation of the first aspect, each of the first and second satellites comprises a low earth orbiting (LEO) satellite.

In another implementation of the first aspect, the first satellite is different than the second satellite.

In another implementation of the first aspect, the first satellite is the same as the second satellite.

In another implementation of the first aspect, the first SMTC is associated with the serving cell of the first satellite and the second SMTC is associated with the second cell of the second satellite.

In another implementation of the first aspect, the plurality of SMTCs further comprises at least a third SMTC, wherein the offset value of the first SMTC is the same as an offset value of the third SMTC.

In another implementation of the first aspect, each SMTC comprises a duration of time within which at least one of an SSB or channel state information-reference signal (CSI-RS) is detectable by the UE for performing the measurement procedure.

In another implementation of the first aspect, a difference between propagation delay periods associated with the first and second satellites for receiving and transmitting radio signals is larger than a threshold.

In a second aspect, a UE connected to a serving cell associated with a first satellite is provided. The UE includes one or more non-transitory computer-readable media having computer-executable instructions to perform measurements. The UE also includes at least one processor coupled to the one or more non-transitory computer-readable media, and configured to execute the computer-executable instructions to receive a measurement configuration comprising a plurality of synchronization signal block (SSB) measurement timing configurations (SMTCs), each SMTC having at least an offset value, wherein a first SMTC in the plurality of SMTCs has a first offset value that is different from a second offset value of a second SMTC of the plurality of SMTCs; receive a signal to perform a measurement procedure for a second cell associated with a second satellite; and perform the measurement procedure based on the received plurality of SMTCs.

BRIEF DESCRIPTION OF THE DRAWINGS

Aspects of the exemplary disclosure are best understood from the following detailed description when read with the accompanying figures. Various features are not drawn to scale, and dimensions of various features may be arbitrarily increased or reduced for clarity of discussion.

DETAILED DESCRIPTION

Figure 1:
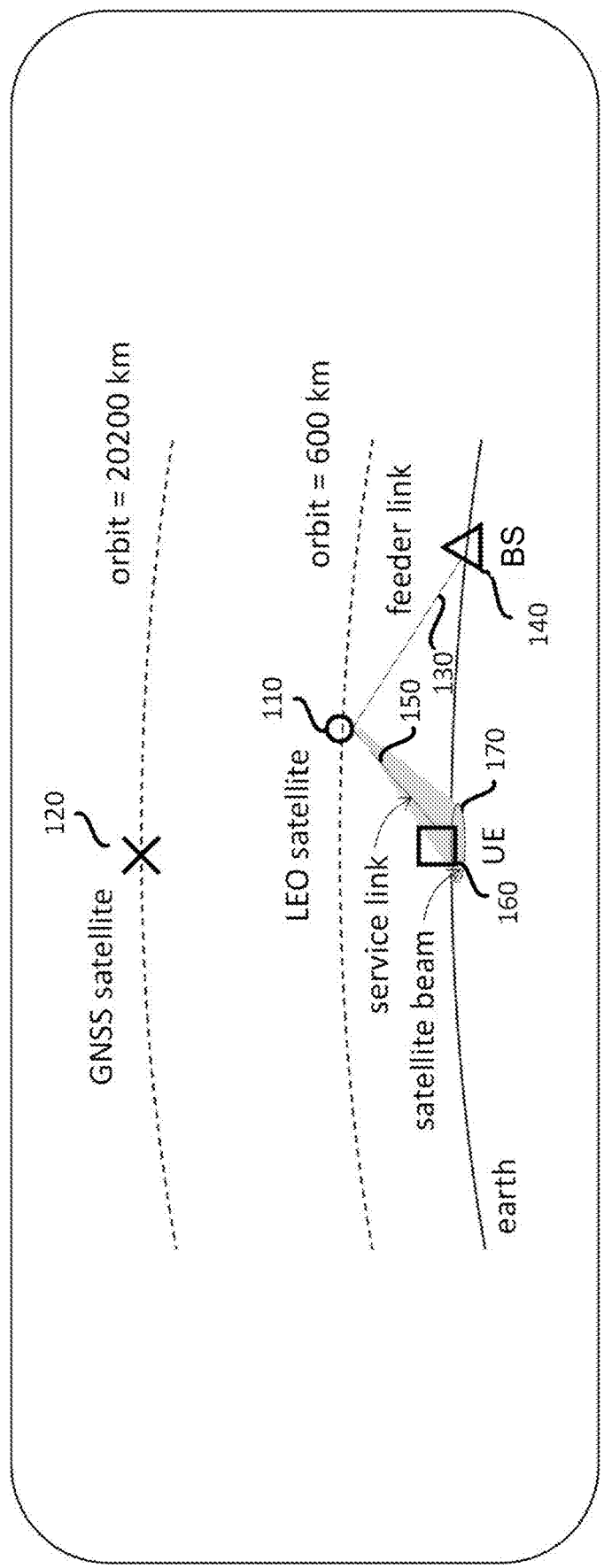
FIG. 1 illustrates LEO and GEO satellites in a transparent-payload deployment, according to an example implementation of the present application.

The acronyms in the present application are defined as follows and unless otherwise specified, the acronyms have the following meanings:

| Acronym | Full name |
| --- | --- |
| 3GPP | $3^{rd}$ Generation Partnership Project |
| 5GC | 5G Core |
| ACK | Acknowledgement |
| AMF | Access and Mobility Management Function |
| ARQ | Automatic Repeat Request |

| Acronym | Full name |
| --- | --- |
| AS | Access Stratum |
| BCCH | Broadcast Control Channel |
| BCH | Broadcast Channel |
| BFR | Beam Failure Recovery |
| BS | Base Station |
| BSR | Buffer Status Report |
| BWP | Bandwidth Part |
| CA | Carrier Aggregation |
| CBRA | Contention Based Random Access |
| CFRA | Contention Free Random Access |
| CG | Configured Grant |
| CM | Connection Management |
| CN | Core Network |
| C-RNTI | Cell Radio Network Temporary Identifier |
| CS-RNTI | Configured Scheduling Radio Network Temporary Identifier |
| CSI-RS | Channel State Information Reference Signal |
| DCI | Downlink Control Information |
| DL | Downlink |
| DRB | Data Radio Bearer |
| DRX | Discontinuous Reception |
| HARQ | Hybrid Automatic Repeat Request |
| IE | Information Element |
| LCH | Logical Channel |
| LCG | Logical Channel Group |
| LCP | Logical Channel Prioritization |
| MAC | Medium Access Control |
| MIB | Master Information Block |
| MSG | Message |
| NAS | Non-Access Stratum |
| NG-RAN | Next-Generation Radio Access Network |
| NR | New Radio |
| NW | Network |
| PCell | Primary Cell |
| PCCH | Paging Control Channel |
| PDCCH | Physical Downlink Control Channel |
| PDCP | Packet Data Convergence Protocol |
| PDU | Protocol Data Unit |
| PRACH | Physical Random Access Channel |
| PUCCH | Physical Uplink Control Channel |
| PUSCH | Physical Uplink Shared Channel |
| PLMN | Public Land Mobile Network |
| QoS | Quality of Service |
| RA | Random Access |
| RACH | Random Access Channel |
| RAN | Radio Access Network |
| RB | Radio Bearer |
| Rel | Release |
| RLC | Radio Link Control |
| RNA | RAN-based Notification Area |
| RNTI | Radio Network Temporary Identifier |
| RRC | Radio Resource Control |
| RSRP | Reference Signal Receiving Power |
| SCell | Secondary Cell |
| SCG | Secondary Cell Group |
| SCS | Sub Carrier Spacing |
| SDT | Small Data Transmission |
| SDU | Service Data Unit |
| SFN | System Frame Number |
| SI | System Information |
| SIB | System Information Block |
| SINR | Signal to Interference plus Noise Ratio |
| SLIV | Start and Length Indicator |
| SNPN | Stand-alone Non-Public Network |
| SR | Scheduling Request |
| SRB | Signaling Radio Bearer |
| SSB | Synchronization Signal Block |
| S-TMSI | SAE-Temporary Mobile Subscriber Identity |
| SUL | Supplementary Uplink |
| TA | Timing Advance or Time Alignment |
| TAG | Timing Advance Group |
| TS | Technical Specification |
| UE | User Equipment |
| UL | Uplink |
| UPF | User Plane Function |

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one base station, at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a 5G Core (5GC), or an internet), through a RAN established by one or more base stations.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A base station may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present application should not be limited to the above-mentioned protocols.

A base station may include, but is not limited to, a node B (NB) as in the UMTS, an evolved node B (eNB) as in the LTE or LTE-A, a radio network controller (RNC) as in the UMTS, a base station controller (BSC) as in the GSM/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

The base station may be operable to provide radio coverage to a specific geographical area using a plurality of cells included in the RAN. The BS may support the operations of the cells. Each cell may be operable to provide services to at least one UE within its radio coverage. Specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmission). The BS may communicate with one or more UEs in the radio communication system through the plurality of cells.

A cell may allocate sidelink (SL) resources for supporting Proximity Service (ProSe) or Vehicle to Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resources may also be provided in an NR frame to support ProSe services, (E-UTRA/NR) sidelink services, or (E-UTRA/NR) V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

As discussed above, the next-generation (e.g., 5G NR) wireless network is envisioned to support more capacity, data, and services. A UE configured with multi-connectivity may connect to a Master Node (MN) as an anchor and one or more Secondary Nodes (SNs) for data delivery. Each one of these nodes may be formed by a cell group that includes one or more cells. For example, a Master Cell Group (MCG) may be formed by an MN, and a Secondary Cell Group (SCG) may be formed by an SN. In other words, for a UE configured with dual connectivity (DC), the MCG is a set of one or more serving cells including the PCell and zero or more secondary cells. Conversely, the SCG is a set of one or more serving cells including the PSCell and zero or more secondary cells.

As also described above, the Primary Cell (PCell) may be an MCG cell that operates on the primary frequency, in which the UE either performs the initial connection establishment procedure or initiates the connection reestablishment procedure. In the MR-DC mode, the PCell may belong to the MN. The Primary SCG Cell (PSCell) may be an SCG cell in which the UE performs random access (e.g., when performing the reconfiguration with a sync procedure). In MR-DC, the PSCell may belong to the SN. A Special Cell (SpCell) may be referred to a PCell of the MCG, or a PSCell of the SCG, depending on whether the Medium Access Control (MAC) entity is associated with the MCG or the SCG. Otherwise, the term Special Cell may refer to the PCell. A Special Cell may support a Physical Uplink Control Channel (PUCCH) transmission and contention-based Random Access, and may always be activated. Additionally, for a UE in an RRC_CONNECTED state that is not configured with the CA/DC, may communicate with only one serving cell (SCell) which may be the primary cell. Conversely, for a UE in the RRC_CONNECTED state that is configured with the CA/DC a set of serving cells including the special cell(s) and all of the secondary cells may communicate with the UE.

As described above, according to the 3GPP specification, an SSB measurement timing configuration (SMTC) window has to be signaled to the UE for the UE to be able to detect the SSBs and perform measurements based on the detected SSBs. The SMTC configuration may include the periodicities and offsets of the SSB signals. Since in NTNs, all the signals include a propagation delay, the UE may miss the SSB measurement windows if it relies on the periodicities and offsets that are defined in the current SMTC configurations. As such, some of the present implementations provide one or more additional offset values that are different than the tradition offset values defined in the current SMTC configurations. This way, the UE may be able to identify the SSB signals that are received within their corresponding SMTC windows. Performing the measurements properly and accurately may enable the UE to perform an accurate handover procedure and switch from its current primary and/or secondary serving cell(s) to the best new candidate serving cell(s).

Figure 2:
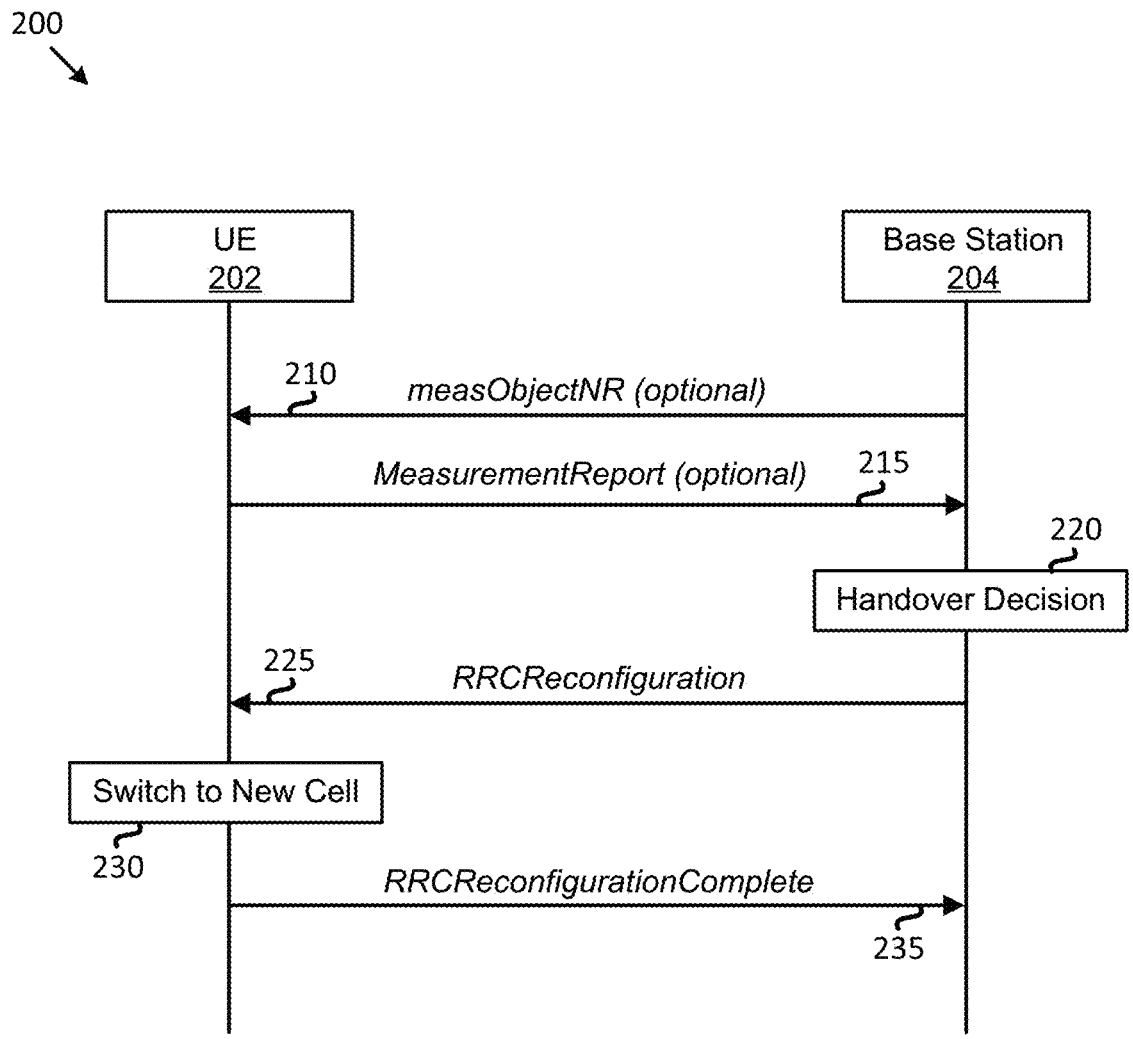
FIG. 2 is a diagram illustrating Intra-BS mobility in which a UE changes its primary cell (PCell), according to an example implementation of the present application.

FIG. 2 is a diagram 200 illustrating Intra-BS mobility in which a UE changes its primary cell (PCell), according to an example implementation of the present application. More specifically, a base station (e.g., a gNB) may modify the UE's RRC connection, for example, by explicitly signaling an RRC reconfiguration message to the UE, in order to change the UE's PCell in some implementations.

As shown in FIG. 2, base station 204 may send, at 210, a measurement object (e.g., an information element, such as the measObjectNR) to UE 202, for example, to configure a measurement procedure. The measObjectNR information element (IE) may include, in some implementations, at least two SMTCs. The first SMTC (SMTC1) may include the primary SSB measurement timing configuration. UE 202 may set up the first SMTC through the received periodicity and offset parameters (e.g., periodicityAndOffset parameter) that is included in the SMTC1 configuration. The periodicityAndOffset parameter, in some implementations, include the periodicity and offset (e.g., given in number of subframes) of the measurement window in which the SS/PBCH blocks (SSBs) are to be received.

The second SMTC (SMTC2) may include a secondary measurement timing configuration for the SS/PBCH blocks corresponding to the Physical Cell ID (PCI) (e.g., listed in a pci-List parameter). When SMTC2 is present, for cells that are indicated in the pci-List parameter in SMTC2 (e.g., of the same MeasObjectNR), the UE may set up an additional SMTC. In some implementations, a pci-List parameter may include a list of physical cell identities, which may be used for different purposes. ssbFrequency is another parameter included in SMTC2 which indicates the frequency of the SSB associated with the MeasObjectNR carrying the second SMTC. Similarly, ssbSubcarrierSpacing is another parameter in SMTC2 that indicates the subcarrier spacing (SCS) of SS/PBCH block (SSB). In some implementations, the only applicable values may include 15 kHz or 30 kHz (e.g., for FR1), and 120 kHz or 240 kHz (e.g., for FR2).

After receiving the measurement object (e.g., at 210), UE 202 may transmit, at 215, a measurement results report to the NW (e.g., to BS 204), according to the measurement configurations. For a measurement ID (e.g., measId), for example, for which the measurement reporting procedure has been triggered, UE 202 may set the measResults within the MeasurementReport message. At 220, BS 204 may decide whether to handover the UE (e.g., change the PCell on the same gNB in this example) based on the MeasurementReport and Radio Resource Management (RRM) information. After making such a decision, BS 204 may provide, at 225, the RRC configuration to UE 202, for example, by sending an RRCReconfiguration message to the UE, which may include at least the cell ID and all other information required to access the target cell, such that the UE may be able to gain access to the target cell (e.g., without reading the system information).

At operation 230, UE 202 may move to the serving cell, for example, by moving the RRC connection to the target cell (e.g., by detaching from the old serving cell and synchronizing with the new target cell). UE 202 may synchronize with the target cell and complete the RRC handover procedure by sending, at 235, a reconfiguration completed message (e.g., an RRCReconfigurationComplete message) to BS 204.

Figure 3:
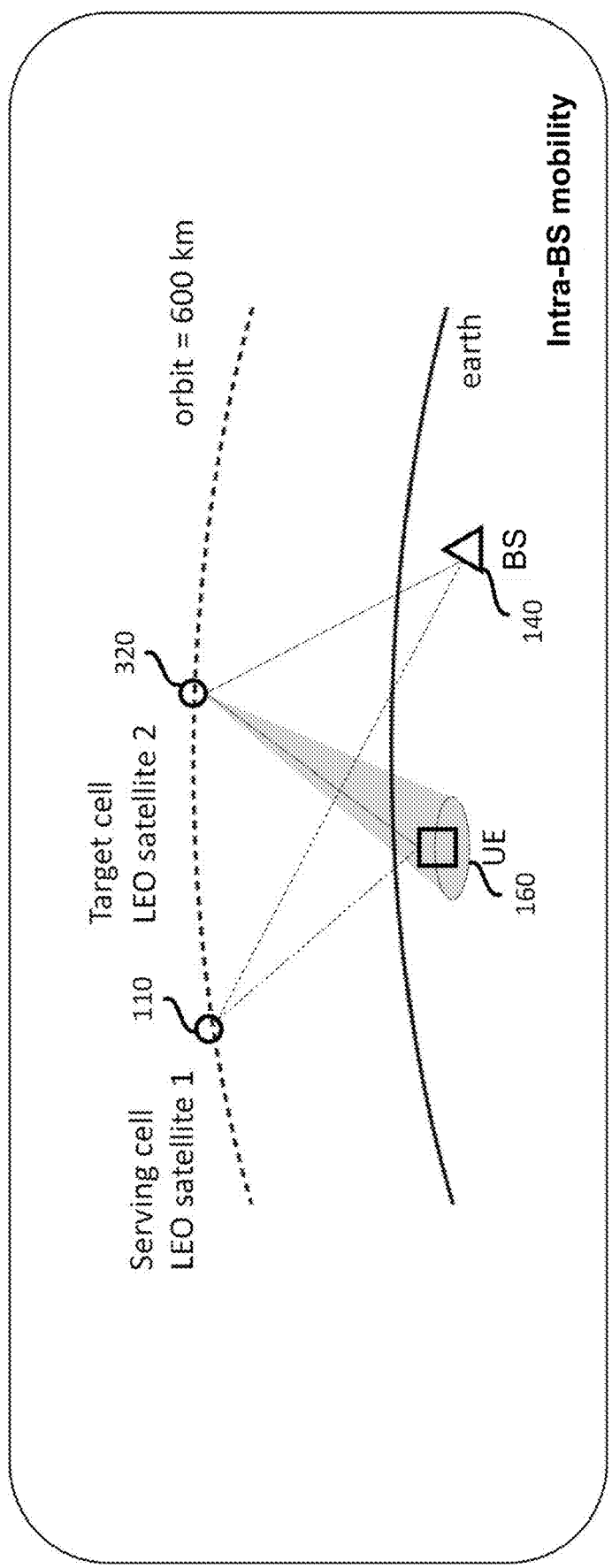
FIG. 3 illustrates an example in which a serving satellite between a BS and a UE changes to a second satellite between the BS and the UE, according to an example implementation of the present application.

In NTN, a serving satellite between a BS and a UE may change from time to time, while the BS and the UE may remain the same. This scenario may be called an intra-BS satellite handover procedure. FIG. 3 illustrates an example in which a serving satellite between a BS and a UE changes to a second satellite between the BS and the UE, according to an example implementation of the present application. FIG. 3 illustrates the same LEO satellite 110, BS 140, and UE 160 as shown above, with reference to FIG. 1. However, as shown in FIG. 3, source LEO satellite 110 may be handed over to target LEO satellite 320, to which the same BS 140 and UE 160 may be connected. In such a case, BS 140 may not have propagation delay information between the UE and target satellite 320. As a result, determining a proper SMTC configuration and making a correct handover decision may be at issue.

Figure 4:
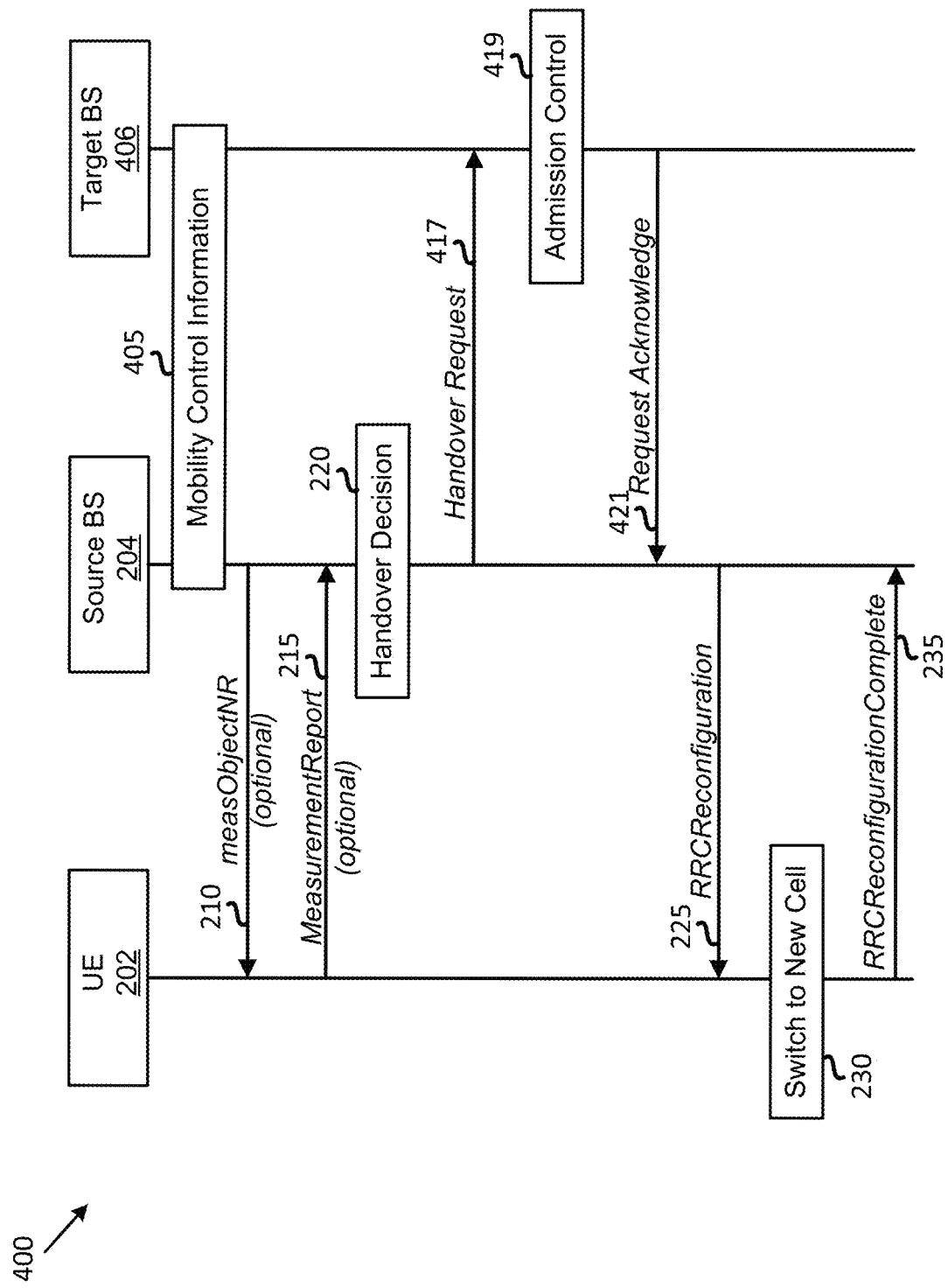
FIG. 4 is a diagram illustrating Intra-BS mobility in which a UE changes its PCell, according to an example implementation of the present application.

An Inter-BS mobility NTN may include an intra-NR radio access technology (RAT) handover, where the handover preparation messages may be directly exchanged between the base stations, for example, without the involvement of the 5G core network (5GC). FIG. 4 is a diagram 400 illustrating Intra-BS mobility in which a UE changes its PCell, according to an example implementation of the present application. As shown in the figure, at operation 405, the UE context in the source BS may contain mobility control information regarding roaming and access restrictions which may be provided during the connection establishment time. Operations 210, 215, and 220 are the same as described above with reference to FIG. 2.

At operation 417, source BS 202 may send a handover (HO) request message to target BS 406 with the necessary information to prepare the handover at the target side. The information may include at least the target cell ID, RRM-configuration, etc.

Target BS 406 may make, at 419, an admission control decision, prepare the handover, and send, at 421, a handover request acknowledgement to source BS 202. The acknowledgement may include an RRC message to be sent to the UE to perform the handover procedure.

Source BS 202 may provide the RRC configuration to the UE by forwarding, at 225, an RRCReconfiguration message, that is received in the handover request acknowledge from the target BS. The RRCReconfiguration message may include at least a cell ID, a new Cell Radio Network Temporary Identifier (C-RNTI), and the system information of the target cell. It may also provide the RRM information of the target cell, such as the SMTC IE for the SSB periodicity, offset, and duration configuration of the target cell for the NR PSCell and PCell changes. If the SMTC is absent, the UE may use the SMTC in the measObjectNR that has the same SSB frequency and subcarrier spacing, as configured before the reception of the RRC message in some implementations. The UE may synchronize with the target cell and complete the RRC handover procedure by sending an RRCReconfigurationComplete message to target BS 406.

Figure 5:
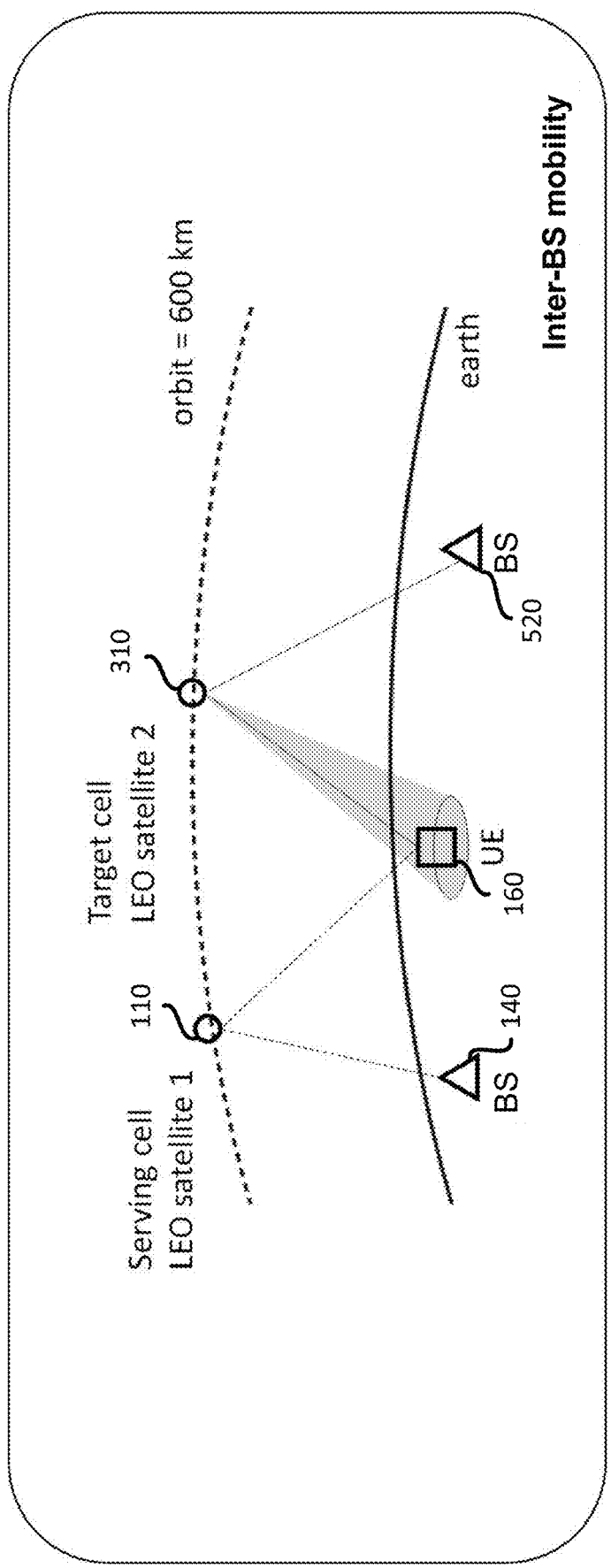
FIG. 5 illustrates an example where a serving satellite that is positioned between a first BS and a UE changes to a second satellite that is positioned between a second BS and the UE, according to an example implementation of the present application.

In NTN, a serving satellite connected to a source BS may change to a target satellite connected to a different target BS from time to time, while the UE may remain the same. This scenario may be called an inter-BS satellite handover procedure. FIG. 5 illustrates an example where a serving satellite that is positioned between a first BS and a UE changes to a second satellite that is positioned between a second BS and the UE, according to an example implementation of the present application. FIG. 5 illustrates the same LEO satellite 110, BS 140, and UE 160 as shown above, with reference to FIG. 1. However, as shown in FIG. 5, source LEO satellite 110 may be handed over to target LEO satellite 320, to which, another BS 520 and UE 160 may be connected. In such a case, since both the source and the target base stations may not have the propagation delay information between the UE and the new satellite (e.g., satellite 310), determining a proper SMTC configuration and making a correct handover decision may be at issue.

Figure 6:
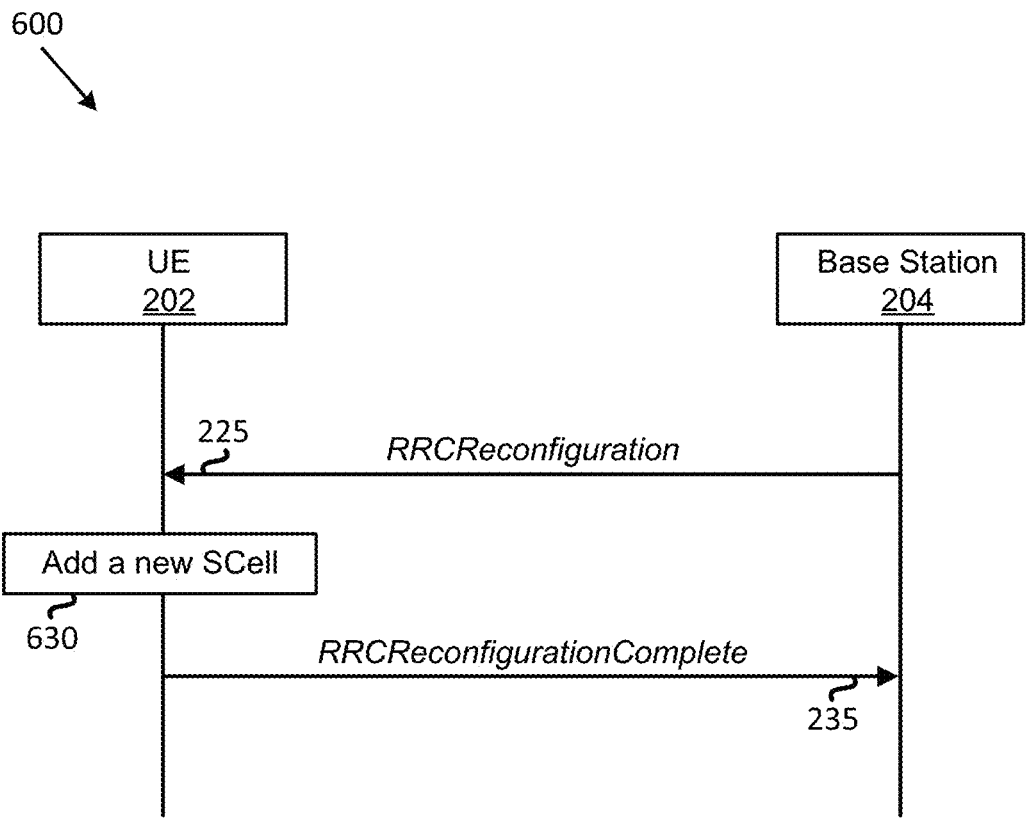
FIG. 6 is a diagram illustrating a cell addition operation, according to an example implementation of the present application.

In some implementations, a secondary cell (SCell) addition procedure may be used to add a new SCell to a network to form (e.g., together with a PCell) a set of serving cells, for example, when carrier aggregation (CA) is configured. The configured set of serving cells for a UE may therefore include one PCell and one or more SCells. The addition of an SCell may be performed by explicit (dedicated) RRC signaling of the RRC reconfiguration from the NW to the in some implementations. FIG. 6 is a diagram 600 illustrating a cell (e.g., an SCell) addition operation, according to an example implementation of the present application. FIG. 6 includes the same UE 202 and base station 204, as shown in FIG. 2, communicating to each other.

BS 204 may provide, at 225, an RRC configuration, for example, through an RRCReconfiguration message to UE 202. The reconfiguration message may include an SCellConfig IE that may have at least an SCell ID and a dedicated SCell configuration. BS 204 may provide the SMTC of the target SCell as well as an indicator of the SCell state being activated or deactivated once the SCell is configured. UE 202 may then add, at 630, the new SCell, synchronize with the target SCell, and complete the SCell addition procedure by sending, at 235 an RRCReconfigurationComplete message to BS 204.

In NTN, the SCell addition procedure may be used for CA-based mobility by procedures, such as SCell addition and release, to achieve the definition of zero millisecond (0ms) service interruption time. It may also be used to connect multiple satellites with the same BS to, for example, enhance the robustness of the network, as the diversity increases. A proper SMTC configuration, however, may be at issue when the propagation delay for the target SCell (e.g., satellite 310, as shown in FIG. 5) is unknown by the serving BS.

In NR, early measurement reporting (EMR) is used for early and fast reporting of the measurement information by the neighboring and serving cells (e.g., to a UE) to reduce any delays in setting up a multi-radio dual connectivity (MR-DC) and/or CA. The EMR, in some implementations, may be initialized via a (dedicated) RRC release message (e.g., RRCRelease) received from the NW.

Figure 7:
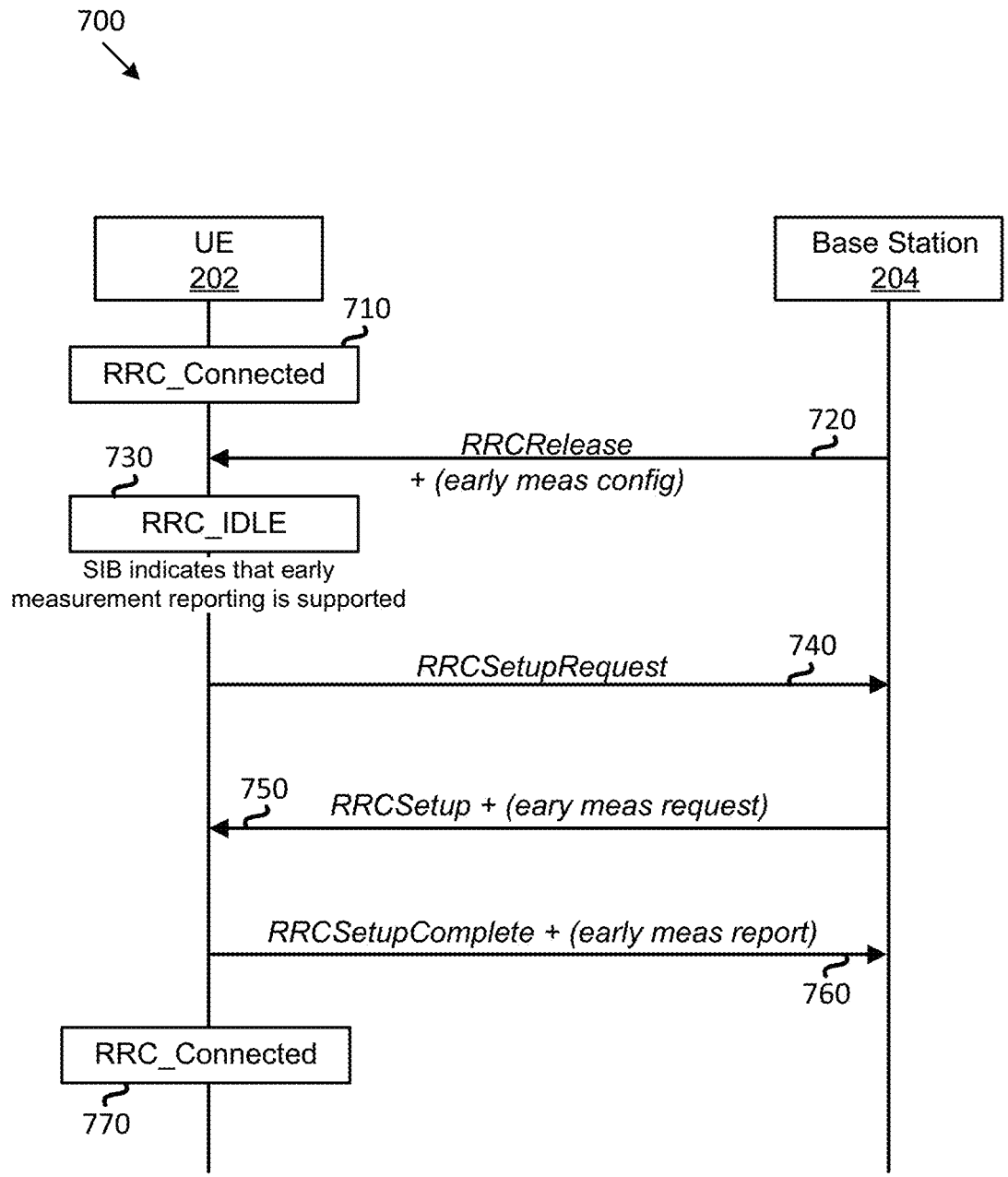
FIG. 7 is a diagram illustrating an EMR initialization using RRC signaling, according to an example implementation of the present application.

FIG. 7 is a diagram 700 illustrating an EMR initialization using RRC signaling, according to an example implementation of the present application. FIG. 7 includes the same UE 202 and base station 204, as shown in FIG. 2, communicating with each other. At 710, UE 202 is in an RRC Connected state. As will be described in more detail below with reference to FIG. 8, a UE may have three different RRC states. The requirements described herein for a cell (re)selection operation may be applied to a UE in an LTE/NR RRC_INACTIVE, RRC_IDLE and/or RRC_CONNECTED state. As such, these different RRC states are described below first.

Figure 8:
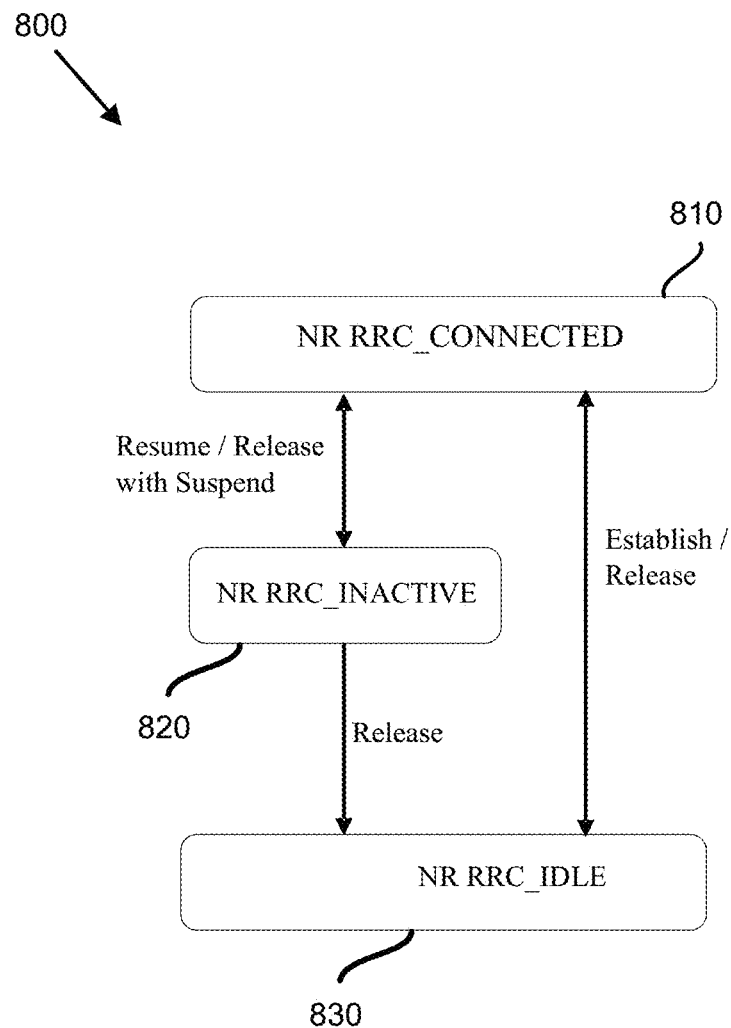
FIG. 8 is an RRC state transition diagram illustrating various RRC states and RRC transition procedures that a UE may undergo within a next generation radio access network, according to an example implementation of the present application.

FIG. 8 is an RRC state transition diagram illustrating various RRC states and RRC transition procedures that a UE may undergo within a next generation radio access network, according to an example implementation of the present application. The RRC state transition diagram 800 may include RRC_CONNECTED state 810, RRC_INACTIVE state 820, and RRC_IDLE state 830. In some implementations, the RRC Connected, RRC Inactive, and RRC Idle states may be three RRC states independent of one another. As shown in FIG. 8, a UE may transition among the three RRC states. The proposed mechanism may be applied to the UE during a target SIB reception procedure independent of the UE's RRC state (e.g., RRC_CONNECTED state, RRC_INACTIVE state, and RRC_IDLE state). In addition, the proposed mechanisms may also be applicable to UEs without being impacted by the state transitions between the RRC states.

For example, a UE may transition to RRC_INACTIVE state 820 from RRC_CONNECTED state 810 or may transition from RRC_INACTIVE state 820 to any of RRC_CONNECTED state 810 or RRC_IDLE state 830. However, as shown in RRC state transition diagram 800, a UE may not transition directly from RRC Idle state 830 to RRC Inactive state 820 in some implementations. That is, a UE may transition to RRC Inactive state 820 from RRC Idle state 830 through RRC Connected state 810 in some such implementations. In some aspects of the present implementations, a UE may also transition from RRC Connected state 810 to RRC Inactive state 820 using an RRC Suspend (or RRC Release with Suspend (configuration)) procedure. Conversely, the UE may transition from RRC Inactive state 820 to RRC Connected state 810 using an RRC (Connection) Resume procedure. Additionally, the UE may use an RRC Release procedure to transition from RRC Connected state 810 to RRC Inactive state 820 or RRC Idle state 830, while using an RRC Establish procedure to transition from RRC Idle state 830 to RRC Connected state 810.

In some implementations, in an RRC_INACTIVE state, a UE may remain as Connection Management (CM)-CONNECTED (e.g., where the UE has signaling connection with AMF) and may move within an area configured by the NG-RAN (e.g., RNA) without notifying the NG-RAN. In the RRC_INACTIVE state, the last serving cell (e.g., associated with a gNB) and the UE itself may keep the UE context (e.g., the UE (Inactive) Access Stratum (AS) context of the UE) and the UE-associated NG connection with the serving AMF and UPF.

In some implementations, the RRC_INACTIVE state may support various functions and/or characteristics, such as, small data transmission (SDT), PLMN selection, SNPN selection, broadcast of system information, cell re-selection mobility, paging initiated by NG-RAN (RAN paging), RAN-based notification area (RNA) managed by NG-RAN, DRX for RAN paging configured by NG-RAN, 5GC-NG-RAN connection (e.g., both control/user (C/U)-planes) established for the UE, UE AS context stored in NG-RAN and the UE, NG-RAN determining the RNA to which the UE belongs, etc. In some implementations, for NR connected to 5GC network, a UE's identity (e.g., full I-RNTI and/or short I-RNTI) may be used to identify the UE context (and the anchor cell/BS which stores the UE context) in the RRC_INACTIVE state. The I-RNTI may provide the new NG-RAN node with a reference to the UE context corresponding the old NG-RAN node.

How the new NG-RAN node is able to resolve the old NG-RAN ID from the I-RNTI is a matter of proper configuration in the old and new NG-RAN nodes. Some typical partitioning of a 40-bit I-RNTI my include, but is not limited to, a UE specific reference, an NG-RAN node address index, PLMN-specific information, and SNPN-specific information. A UE specific reference may include a reference to the UE context within a logical NG-RAN node. An NG-RAN node address index may include information that identify the NG-RAN node that allocates the UE specific part. Network-specific information (e.g., PLMN-specific information or SNPN-specific information) may include information that support network sharing deployments, and provide an index to the PLMN ID part of the Global NG-RAN node identifier. SNPN may include a small network that is configured by an operator. Each SNPN may be identified by a unique SNPN identity (ID) (e.g., an identifier for an SNPN may be a combination of a PLMN ID and an NID). A configured grant configuration may be associated with an SNPN ID.

In some implementations, the AS Context for a UE in RRC_INACTIVE state may be stored when the (RRC) connection is suspended (e.g., when the UE is in an RRC_INACTIVE state) and may be restored/retrieved when the connection is resumed (e.g., when the UE transitions from the RRC_INACTIVE state to an RRC_CONNECTED state). The suspension of the RRC connection may be initiated by the network (e.g., the serving RAN). When the RRC connection is suspended, the UE may store the UE Inactive AS context (and any related configuration received from the network), and may transition to an RRC_INACTIVE state. If the UE is configured with SCG, the UE may release/suspend (all or part of) the SCG configuration upon initiating an RRC Connection Resume procedure. The RRC message to suspend the RRC connection may be integrity-protected and ciphered. Resumption from a suspended RRC connection may be initiated by upper layers (e.g., NAS layer/RRC layer in the UE side) when the UE needs to transition from an RRC_INACTIVE state to an RRC_CONNECTED state, or by the RRC layer to perform an (event-triggered/periodical) RNA update, or by RAN paging, for example, from NG-RAN. When the RRC connection is resumed, the network may configure the UE according to the RRC connection resume procedure and based on the stored UE Inactive AS context (and any related RRC configuration received from the network). The RRC connection resume procedure may reactivate the AS security (and the NAS security) and reestablish the SRB(s) and DRB(s).

In some implementations, in response to a request to resume an RRC connection, the network may perform any of the following procedures. In some implementations, in response to such a request, the network may resume the suspended RRC connection and send the UE to an RRC_CONNECTED state, or may reject the request and send the UE to an RRC_INACTIVE state (e.g., with a wait timer). In some other implementations, the network may directly re-suspend the RRC connection in response to the request and send the UE to an RRC_INACTIVE state, or may directly release the (RRC) connection and send the UE to an RRC_IDLE mode. In yet other implementations, in response to a request to resume the RRC connection, the network (e.g., RAN or CN) may instruct the UE to initiate a NAS level recovery (e.g., by sending an RRC setup message to the UE). In some implementations, the UE may initiate a Tracking Area Update (e.g., by sending an RRC Resume Request message to the serving cell). In some other implementations, the UE may move to an RRC Idle state and then initiate an RRC establishment procedure after receiving a CN paging from the serving RAN.

In addition, in the RRC_INACTIVE state, the upper layers (or the RRC layer) may configure a UE's specific DRX mechanism. The UE's controlled mobility may be based on the network configuration in the RRC_INACTIVE state, and the UE may store the UE Inactive AS context. Additionally, a RAN-based notification area may be configured by the RRC layer when the UE is in the RRC_INACTIVE state. Furthermore, the UE may perform other functions while in the RRC_INACTIVE state, such as monitoring paging DCI (e.g., that are transmitted by (scrambled) encoded with P-RNTI over DCI); monitoring a Paging channel for CN paging (e.g., using 5G-S-TMSI) and RAN paging (e.g., using full I-RNTI); performing neighboring cell measurements and cell (re-)selection; performing RAN-based notification area updates periodically and/or when moving outside the configured RAN-based notification area; and acquiring system information and sending SI request (e.g., if configured). In some other implementations, the UE may also need to monitor the short message, which is transmitted via the paging DCI, to monitor whether a system information update and/or a public warning service has been initiated, for example, by the serving cell.

Returning to FIG. 7, while UE 202 is in an RRC Connected state, the UE may receive, at 720, a message to release its RRC configuration. In some implementations, BS 204 may have UE 202 release the RRC configuration by sending an RRC release message (e.g., an RRCRelease message) to the UE. The RRC release message may include an IE, such as MeasIdleConfig, that may be used to convey the required information to the UE about measurements requested to be performed by the UE while it is in an RRC_IDLE or an RRC_INACTIVE mode (or state). The IE may also provide SMTC configuration for the target SSB frequency.

After switching to an RRC Idle state (at 730), for example, after determining that the EMR is supported through the received SIB, UE 202 may send an RRC setup request (at 740) to BS 204 to establish an RRC connection. The UE may initiate the RRC set up procedure when the upper layers send a request to establish the RRC connection while the UE is in RRC_IDLE mode. BS 204 may send, at 750, an EEC setup message (e.g., the RRCSetup message) to UE 202. This message may be used to establish signaling radio bearers 1 (SRB1) with the UE. The same RRC setup message may also provide an EMR request.

In response, UE 202 may send an RRC setup complete message (e.g., the RRCSetupComplete message) which may be used to confirm the successful completion of the RRC connection establishment. This message may also provide an IE, such as the idleMeasAvailable IE, to indicate that the UE has the Idle/Inactive measurement report available. The UE may also switch its RRC state (e.g., from an RRC Idle state) to an RRC Connected state.

In NTN, the early and fast reporting features of EMR may be beneficial to handle an issue of frequent and unavoidable handover (HO). However, proper SMTC configuration for RRC_IDLE or RRC_IVACTIVE states may become problematic, considering the fact that the maximum delay variations as seen by the UE may be up to +/−40 μs (microseconds) per second.

In NR, NW may provide an IE, such as the redirectedCarrierinfo IE, that indicates a carrier frequency (e.g., downlink for FDD) and may be used to redirect the UE to an NR or an inter-RAT carrier frequency, using cell selection, for example, when transitioning to an RRC_IDLE or RRC_INACTIVE state. When this IE is included in the RRCRelease message, the UE may attempt to camp on a suitable cell according to the IE (e.g., redirectedCarrierinfo). If the UE cannot find a suitable cell, the UE may camp on any suitable cell of the indicated RAT in some implementations.

Figure 9:
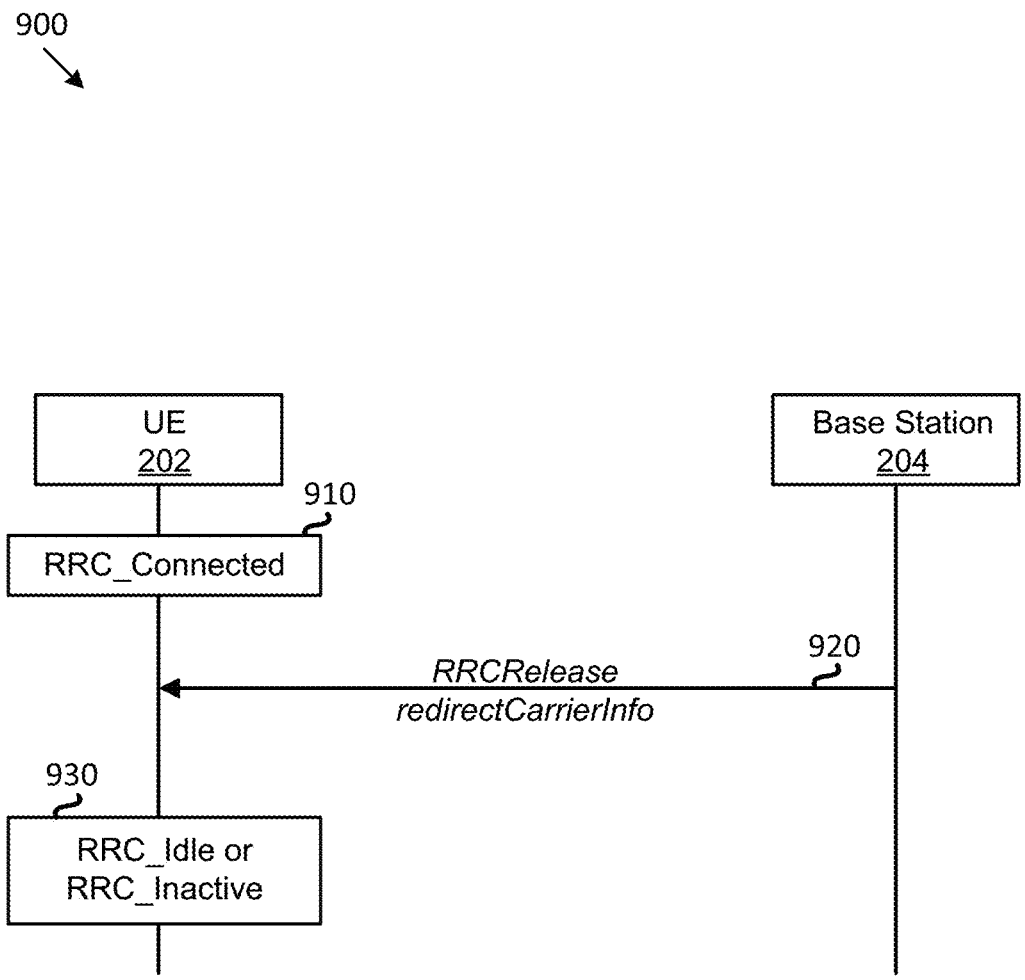
FIG. 9 is a diagram illustrating a UE receiving RRC signaling for camping on a suitable cell, according to an example implementation of the present application.

FIG. 9 is a diagram 900 illustrating a UE receiving RRC signaling for camping on a suitable cell, according to an example implementation of the present application. FIG. 9 includes the same UE 202 and base station 204, as shown in FIG. 2, communicating with each other. At 910, UE 202 is in an RRC Connected state. While UE 202 is in an RRC Connected state, the UE may receive, at 920, a message to release its RRC configuration. In some implementations, BS 204 may have UE 202 release the RRC configuration by sending an RRC release message (e.g., an RRCRelease message) to the UE. As described above, the RRC release message may include an IE, such as edirectedCarrierinfo, that may be used to redirect the UE to an NR or an inter-RAT carrier frequency, using cell selection by the UE while it is in an RRC_IDLE or an RRC_INACTIVE mode (or state) 930. The IE may also provide SMTC configuration, for example, when the CarrierinfoNR is chosen in the IE redirectedCarrierinfo.

For NTN, the carrier frequency redirection may be useful for mobility across different countries. In such a case, each country may have its carrier frequency, while the carrier frequency redirection may be mandatory.

Figure 10:
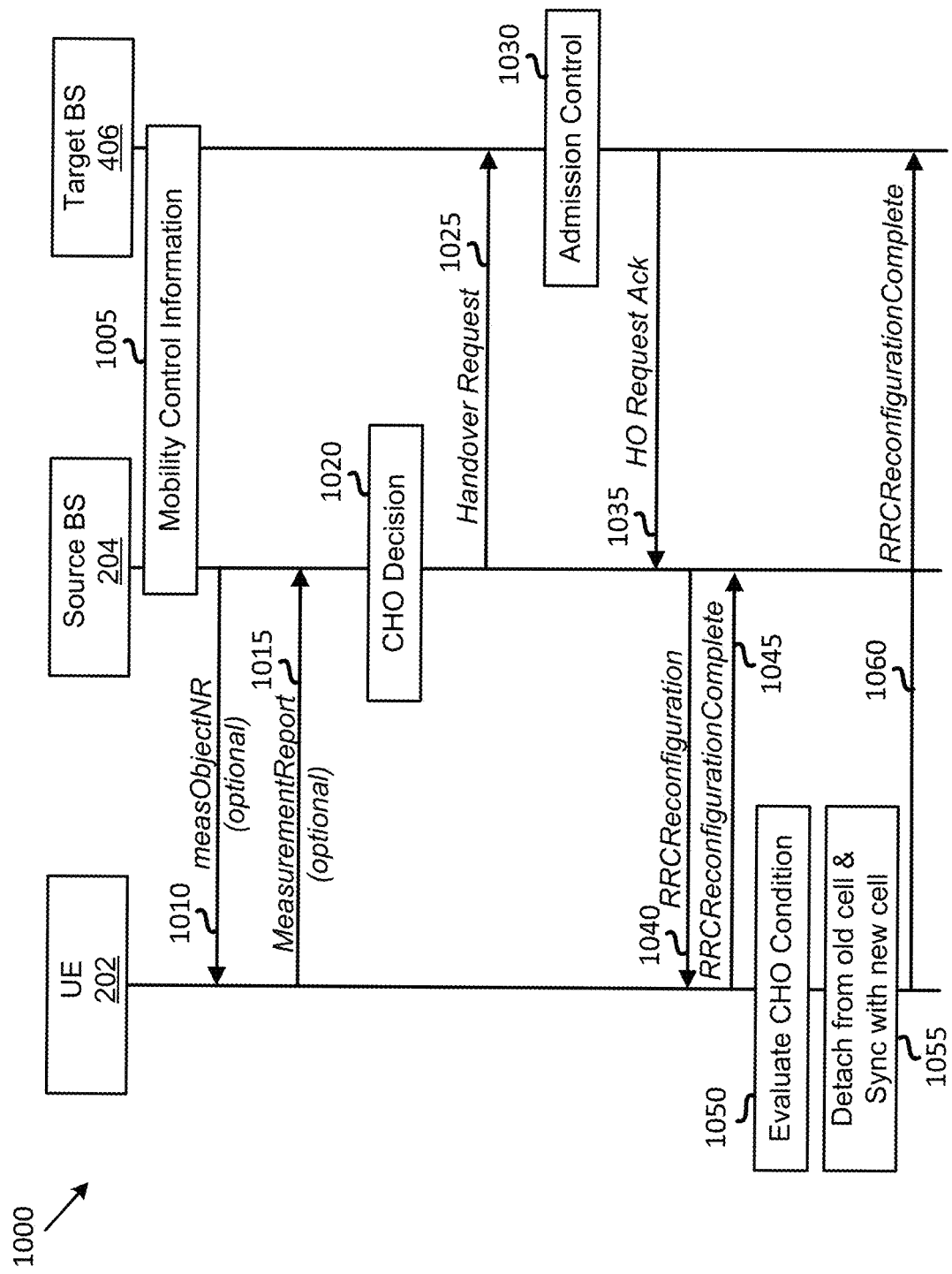
FIG. 10 is a diagram illustrating a conditional handover procedure performed by a UE, according to an example implementation of the present application.

In NR, a conditional handover (CHO) may be defined as a handover procedure that is executed by a UE when one or more handover execution conditions are met. The UE may start evaluating the execution condition(s) upon receiving a CHO configuration and may stop evaluating the execution condition(s) once a CHO procedure is executed. FIG. 10 is a diagram 1000 illustrating a conditional handover procedure performed by a UE, according to an example implementation of the present application. FIG. 10 includes the same UE 202 and base station 204, as well as target BS 406, as shown in FIG. 4, communicating with each other.

As shown in FIG. 10, at operation 1005, the UE context in the source BS may contain mobility control information regarding roaming and access restrictions which may be provided during the connection establishment time. Next, base station 204 may send, at 1010, a measurement object (e.g., an information element, such as the measObjectNR) to UE 202, for example, to configure a measurement procedure (e.g., to perform a conditional handover procedure). After receiving the measurement object, UE 202 may transmit, at 1015, a measurement results report to the NW (e.g., to BS 204), according to the measurement configurations. At operation 1020, based on the measurement results, source BS 202 may decide, to perform a CHO. Consequently, at 1025, BS 202 may send a handover (HO) request message to target BS 406 with the necessary information to prepare the handover at the target side. The information may include at least the target cell ID, RRM-configuration, etc. Additionally, source BS 204 may send the CHO request to or more than one candidate BS. That is, a CHO request message may be sent to each candidate cell (e.g., associated with the same BS 406 or another BS that is not shown in the figure) that is fit for a handover procedure.

Target BS 406 may make, at 1030, an admission control decision, prepare the handover, and send, at 1035, a handover request acknowledgement to source BS 202. The response message 1035 may also be sent to every other candidate cell. Source BS 204 may send an RRCReconfiguration message to UE 202 at 1040. This message may contain the configuration of CHO candidate cell(s) as well as the CHO execution condition(s). The message may also provide the SMTC associated with the target cell. UE 202 may send, at 1045, an RRCReconfigurationComplete message to source BS 204.

UE 202 may maintain the connection with source BS 204 after receiving the CHO configuration and may start, at 1050, evaluating the CHO execution conditions for the candidate cell(s). If at least one CHO candidate cell satisfies the corresponding CHO execution condition(s), UE 202 may detach, at 1055, the source BS 204, apply the stored corresponding configuration for the selected candidate cell (e.g., BS 406), synchronizes with the selected candidate cell, and complete the CHO procedure by sending, at 1060, an RRCReconfigurationComplete message to target BS 406. The UE may also release the stored CHO configurations after a successful completion of the RRC handover procedure.

In an NTN, the CHO procedure (e.g., as described above) may be useful for a feeder link switch. This is because, in some implementations, during the feeder link switch period, a target BS may not be able to broadcast the SSB signals, or to receive the RRC message, due to a loss of the feeder link. For that reason, in some such implementations, the RRC pre-configuration and HO post-execution features of the CHO procedure may be needed.

In NR, cell reselection may be used by a UE that is in an RRC_IDLE or RRC_INACTIVE state to identify a cell on which to camp. This may be performed based on cell reselection criteria which may involve the measurements of the serving (and neighboring) cells, which may be provided at least by SIB2 and SIB4 broadcast in the system information. For example, SIB2 may contain cell re-selection information common for intra-frequency, inter-frequency, and/or inter-RAT cell re-selection, as well as intra-frequency cell re-selection information other than neighboring cell related information. It may also provide SMTC for intra-frequency measurements.

SIB4, in some implementations, may contain information relevant only to inter-frequency cell re-selection (e.g., information about other NR frequencies and inter-frequency for neighboring cells and relevant to the cell reselection). The IE for cell reselection may include different cell reselection parameters that are common for a particular frequency as well as cell-specific reselection parameters. This IE may also provide SMTC for inter-frequency measurements.

In NTN, proper SMTC configurations, especially for a UE that is in an RRC_IDLE or RRC_INACTIVE mode, may be challenging due to rapid satellite movements. As such, identifying the exact locations of SSB signals (e.g., on a DLCCH) may become more and more difficult as time passes.

In some implementations, under certain circumstances, the serving cell may not be aware of the target cells' SSB timing information and the serving and target cells may not be time synchronized. In such cases, System Frame Number (SFN) and Frame Timing Difference (SFTD) measurements performed by the UE may help the network to derive the time difference for the SFN and the frame boundary between the serving and target cells. SFTD measurements may particularly be useful in EN-DC and NE-DC scenarios.

As described, SFTD may refer to the SFN and frame timing difference between an NR PCell and an NR neighboring cell observed by a UE. SFTD may include the following two components: 1) SFN offset that is a difference in SFN (e.g., 10 ms) between the cells and 2) Frame boundary offset which is a difference in basic time unit in LTE (Ts=32.552 ns) between the cells.

Figure 11:
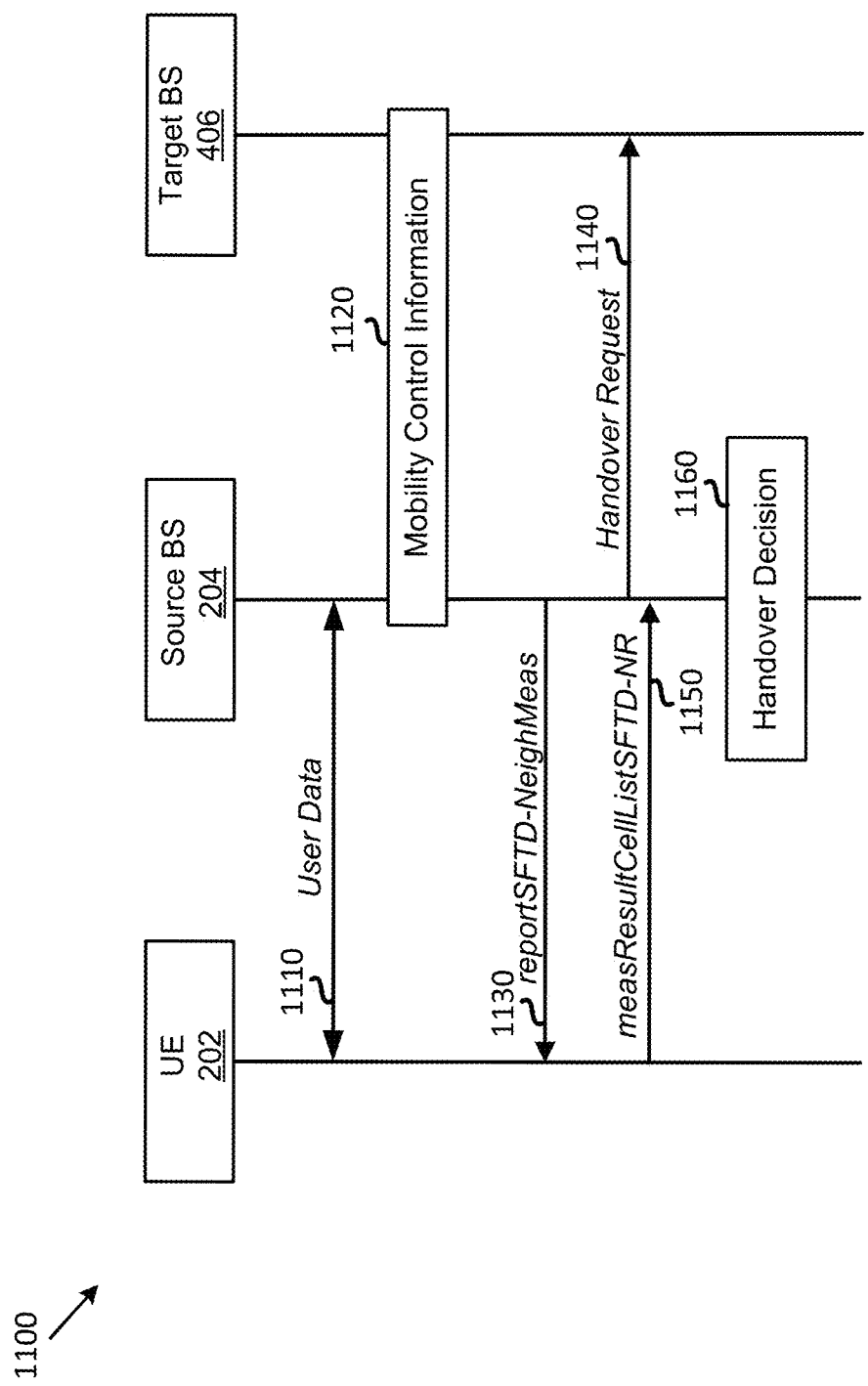
FIG. 11 is a diagram illustrating a UE performing SFTD measurements, according to an example implementation of the present application.

FIG. 11 is a diagram 1100 illustrating a UE performing SFTD measurements, according to an example implementation of the present application. FIG. 11 includes the same UE 202, source BS 204, and target BS 406, as shown in FIG. 4 above, communicating with each other. As shown in the figure, at 1110, UE 202 and source BS 204 are connected (e.g., in an RRC Connected state) and are exchanging data with each other. UE context within source BS 204 may contain information regarding roaming and access restrictions that is provided either at the connection establishment or at the last tracking area (TA) update. This mobility control information 1120 may contain, at least, one of the following inter-node RRC messages: measurement gap configuration (e.g., a gap for UE to ignore one frequency band to measure another frequency band), SFTD cells and frequencies, and UE capability information.

At 1130, source BS 204 may indicate whether the UE is required to perform SFTD measurements between the PCell and its NR neighboring cells (e.g., in an NR standalone condition) by sending an RRC message, such as a reportSFTD-NeighMeas message. The RRC message may also provide the cell IDs to which the report should be sent. The report that is sent to the IDed cells may include different SFTD measurements, a timer to stop the SFTD (e.g., the T322 timer), and whether to report the RSRP.

Next, at 1140, UE 202 may report the SFTD by sending an RRC message measResultCellListSFTD-NR to the selected cells. The message may include the detected cell IDs, the SFN offset results, the radio frame boundary difference results, and the RSRP results (e.g., if the RSRP is configured to the UE).

In NTN, due to the uncertainty on the propagation delay difference (e.g., because of the satellite handover), the SFTD procedure may need to be implemented by other procedures in order to provide sufficient information to the NW.

As described above, if the SMTC measurement gap configuration does not consider the propagation delay difference, the UE may miss the SSB/CSI-RS measurement window and may thus be unable to perform measurements on the configured reference signals in some implementations. Additionally, if SMTC is absent, RRC_CONNECTED UEs may use the default SMTC, for example, that is configured in the measObjectNR having the same SSB frequency and subcarrier spacing. However, the default SMTC (e.g., SMTC1) may not guarantee that the UE may find the target SSB. This is because of the following reasons:

(1) the first reason may be that the propagation delay may change with the satellite movement, which may result in any received SMTC1 configuration becoming outdated after only few seconds, especially when the SMTC window duration is set to a minimum value (e.g., one subframe).

(2) another reason may be that the NTN may need to trigger an inter-BS HO for a feeder link switch (e.g., the link that connects the UE to the same satellite) without losing the service link, but the satellite may have to connect to a new gateway. In this case, the HO decision may not be made according to the measurement result from the SMTC1, but based on the limit of the elevation angle on the feeder link.

If the propagation delay difference between the target and serving cells is larger than the configured SMTC window duration (e.g., 5 ms) for a single SMTC window, it may be impossible for the UE to measure both cells. This may fall to trigger the CHO events (e.g., the CHO event A5) where a serving cell may become worse than an absolute threshold (e.g., thershold1) and a target cell may become better than another absolute threshold (e.g., threshold2).

Figure 12:
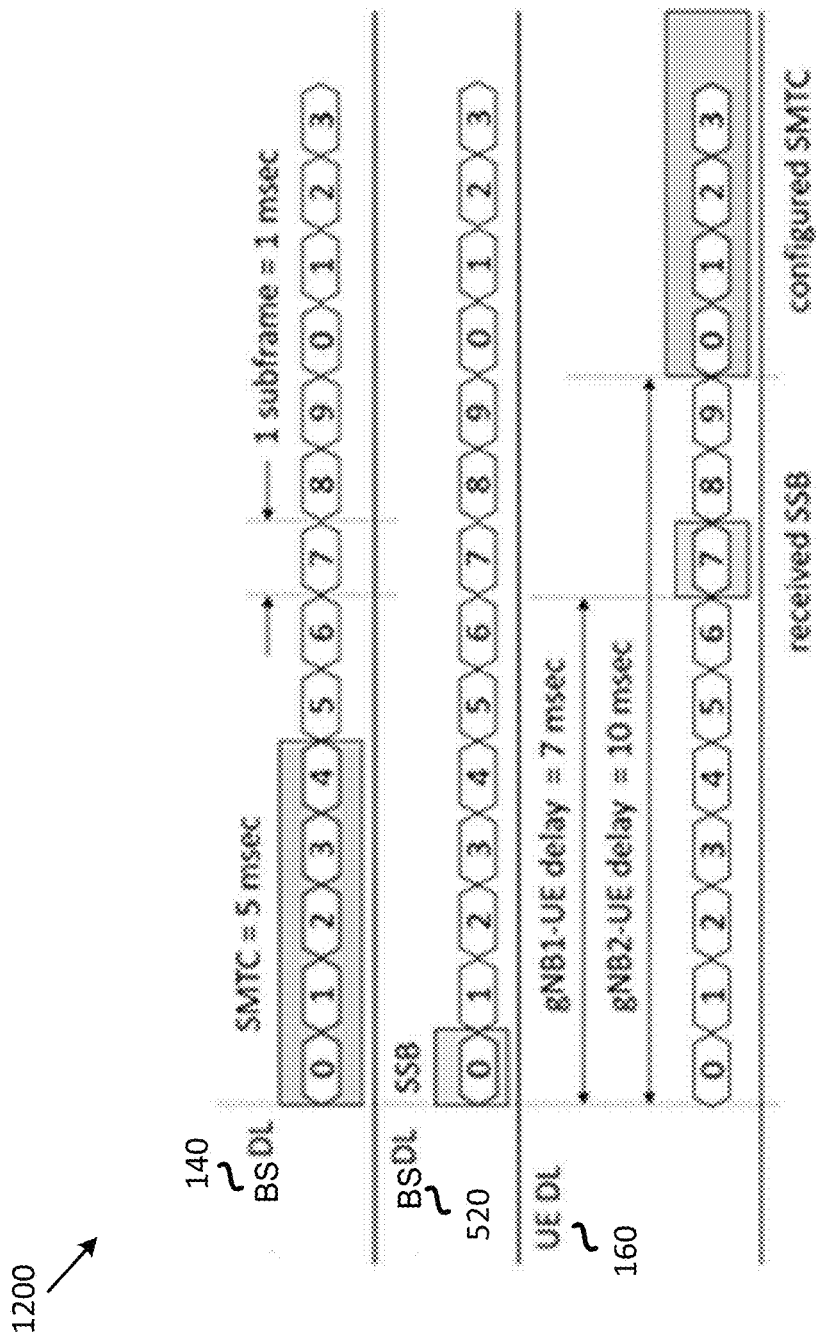
FIG. 12 is a diagram illustrating a UE having significantly different propagation delays between the UEs connection with a first satellite and the UE's connection with a second satellite, according to an example implementation of the present application.

FIG. 12 is a diagram 1200 illustrating a UE having significantly different propagation delays between the UEs connection with a first satellite and the UE's connection with a second satellite, according to an example implementation of the present application. The UE and the two base stations are the same as the UE and base stations shown in FIG. 5. As shown in FIG. 5, UE 140 that is served by an LEO satellite 110, may also be within the coverage area of an incoming LEO satellite 310. The UE may therefore perform measurements of the neighboring cells originating from satellite 310, for example, for mobility purposes based on the measurement configuration provided to the UE. However, the propagation delay difference from UE 160 to satellite 110 and the UE to satellite 310 may vary significantly.

FIG. 12 shows LEO satellite 110 connecting to serving BS 140 and LEO satellite 310 connecting to target BS 520. If there is no delay difference between satellites 110 and 310's connection, BS 140 may be able to configure a proper SMTC window for UE to measure SSB received from target BS 520. However, as shown in FIG. 12, due to the propagation delay difference (e.g., between the different satellite and BS connections), the UE may not be able to receive the SSB from BS 520 in the configured SMTC window. For example, as shown in the figure, there is a 7 ms difference for the BS 140 and UE 160 link, while there is a 10 ms difference for the BS 520 and UE 160 link.

Based on 3GPP specification, when the SSBs are outside the SMTC occasions for RRM measurements, a UE that is in an RRC_CONNECTED state shall not measure the SSBs, except for SFTD measurement (see, e.g., 3GPP TS 38.331 V16.1.0). In some implementations, when the NW has the UE's location and also the satellite ephemeris, the delay difference may be calculated and compensated at the NW side. In such a case, reporting the location of the UE and also the inter-node RRC message exchanging may be mandatory. Otherwise, if the NW does not have the location of the UE, or when the UE cannot report its location, the NW may only rely on triggering the SFTD measurements to support the SSB measurement outside the SMTC. However, not all the UEs may support the SFTD measurements (e.g., in Rel16 NR), and it may depend on the UE's radio access capabilities.

In some implementations, SMTC may be an optional feature and can be configured in one or more of the above-described procedures, such as intra-BS (gNB) HO, inter-BS (gNB) HO, SCell addition, EMR, carrier frequency redirection, CHO, and cell reselection. Since SMTC could be optional, the related IE field may be absent. Table 1 below summarize some UE behaviors when SMTC is absent.

TABLE 1

| Procedure | UE state | Related IE (e.g., in Rel-16 NR) | UE's behavior if SMTC is absent |
|---|---|---|---|
| Intra-gNB HO Inter-gNB HO CHO | RRC_CONNECTED | ReconfigurationWithSync | the UE uses the SMTC in the measObjectNR having the same SSB frequency and subcarrier spacing, as configured before the reception of the RRC message. |
| SCell addition | | SCellConfig | The UE uses the SMTC in the measObjectNR having the same SSB frequency and subcarrier spacing, as configured before the reception of the RRC message. |
| Carrier frequency redirection | | CarrierInfoNR | The UE uses the SMTC configured in the measObjectNR having the same SSB frequency and subcarrier spacing. |
| EMR | RRC_IDLE or RRC_INACTIVE | MeasIdleConfig | the UE assumes that SSB periodicity is a fixed number (e.g., 5 ms) in this frequency |
| Cell reselection | | intraFreqCellReselectionInfo of SIB2 | The UE assumes that SSB periodicity is a fixed number (e.g., 5 ms) for the intra-frequency cells. |
| | | InterFreqCarrierFreqInfo of SIB4 | The UE assumes that SSB periodicity is a fixed number (e.g., 5 ms) for the inter-frequency cells. |

In short, if the SMTC is absent, a UE's default behavior may be divided into two categories:

(1) for an RRC_CONNECTED UE, the UE may use a specific SMTC window for a procedure, if configured, otherwise, the UE may use SMTC1 or SMTC2, as configured to the UE before initiating the procedure. The UE may not consider the SSB transmission outside the SMTC, expect for the SFTD measurements.

(2) For an RRC_IDLE UE or an RRC_INACTIVE UE, the UE may assume the SSB periodicity to be a fixed number (e.g., 5 ms), as the shortest periodicity that a BS may configure. Other measurement parameters, such as periodicity of SMTC window, offset of SMTC window, duration of SMTC window, SSB locations, and target cell IDs, may be given in the SMTC configuration in some implementations and may depend upon the UE's implementation.

In some implementations, the NW may not have all the required information to configure the SMTC. In some such implementations, the NW may have limited options to help a UE measure, or discover, the candidate cells, either to 1) configure a wrong SMTC with a maximum window duration and a minimum SMTC periodicity, 2) set the SMTC as absent and let the UE use SMTC1 or SMTC2 that are configured to the UE beforehand, or 3) trigger the SFTD measurements. However, a wrong SMTC may be useless and act as a redundant parameter signaling, in which case, SMTC1 and SMTC2 may miss the neighboring candidate cells without knowing the propagation delay difference, and the SFTD may be optional and may not be triggered for some procedures.

In some implementations (e.g., based on Rel-16 NR), three SMTC windows may exist, two of which may be for eMBB services (which may have different frequencies, but the same offset in time) and one for IAB services. For eMBB service, the main features of Rel-16 SMTC are like the Rel-15 SMTC design, which are summarized below in Table 2.

TABLE 2

| | | |
|---|---|---|
| Number of SMTC windows | | 2 for intra-frequency 1 for inter-frequency |
| Frequency domain configuration | | Centre frequency may be flexibly configured via ssbFrequency |
| Time domain configuration | Periodicity of SMTC window | Configured via periodicityAndOffset for SMTC1 and periodicity for SMTC2. SMTC1: in {5, 10, 20, 40, 80, 160} msec. SMTC2: in {5, 10, 20, 40, 80} msec. |
| | Offset of SMTC window | Configured via periodicityAndOffset. Same value for both SMTC1 and SMTC2. May be flexibly configured at subframe granularity. |
| | Duration of SMTC window | Configured via duration. Same value for both SMTC1 and SMTC2. May be configured as {1,2,3,4,5} subframes. |

TABLE 2-continued

| | |
|---|---|
| SSB locations | Must follow the SS burst set pattern. Index of SSBs to measure may optionally be configured via parameter ssb-ToMeasure. (same configuration for both SMTC1 and SMTC2) |
| List of PCIs | For SMTC2, pci-List may be configured to indicate the list of associated PCIs. |

To allow the NTN cells (e.g., provided by different satellites) to be discovered or measured by a UE, the corresponding SSBs should be at least partially within the SMTC windows configured to the UE. Limiting the number of SMTC windows to 1 or 2, as described above, may require all the SSBs from neighboring NTN cells to be transmitted within the same 1 or 2 windows. This may result in disablement of the UE to perform accurate measurements, mainly because of the large propagation delay differences among the satellites. As such, some of the present implementations may provide enhanced SMTC configurations that may increase the maximum number of SMTC windows (e.g., that are configurable per frequency). For example, some of the present implementations may increase the maximum number of SMTC windows to a value that is greater than 2.

Some of the present implementations may also provide SMTC configurations in which, the SMTC parameters, such as the SMTC window offset and durations, as well as the indices of SSBs to be measured, may be configured separately (e.g., in SMTC1 and SMTC2). The ability to configure multiple SMTC windows (e.g., with different offsets) within the same period in some such implementations may be necessary to improve the efficiency in the above-described procedures (e.g., CHO, cell addition, EMR measurements, etc.).

Figure 13:
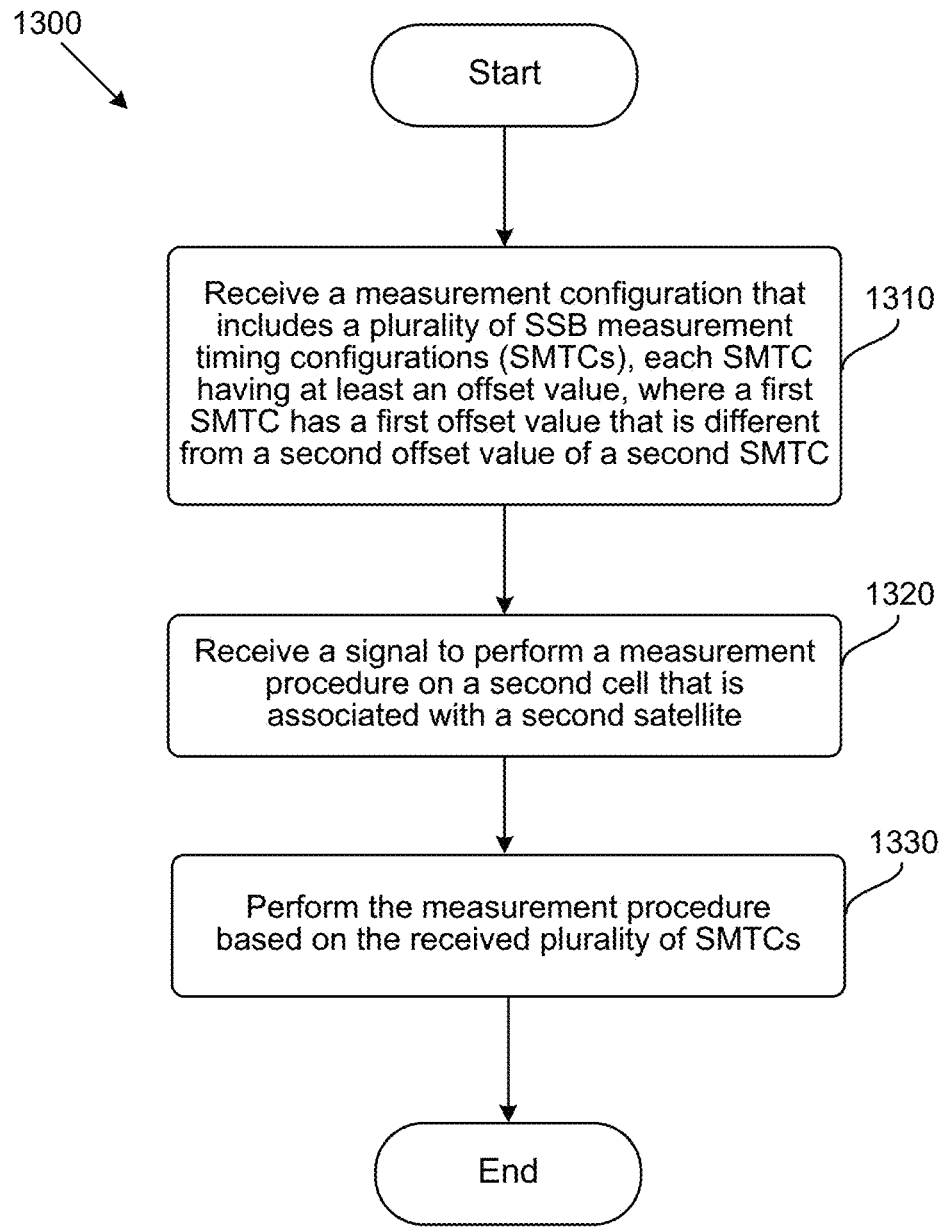
FIG. 13 is a flowchart illustrating a method (or process) for a UE for performing measurements in a handover procedure, according to an example implementation of the present application.

FIG. 13 is a flowchart illustrating a method (or process) 1300 for a UE for performing measurements in a handover procedure, according to an example implementation of the present application. Process 1300, as shown in the figure, may start, at 1310, by the UE receiving a measurement configuration that includes a plurality of synchronization signal block (SSB) measurement timing configurations (SMTCs). In some implementations, each SMTC may have at least one offset value. Additionally, in some implementations, a first SMTC in the plurality of SMTCs may have a first offset value that is different from a second offset value of a second SMTC of the plurality of SMTCs. Process 1300 may then receive, at 1320, a signal to perform a measurement procedure for a second cell that is associated with a second satellite. The process may, upon receiving the signal, perform, at 1330, the measurement procedure based on the received plurality of SMTCs.

In some implementations, as described above, the UE may receive the measurement configuration from a base station (e.g., through a serving cell of the BS), such as source BS 204, with reference to FIGS. 10 and 11. In some implementations, the measurement procedure may be performed for a handover procedure, for example, such that the UE switches its serving cell from one serving cell (e.g., associated with source BS 204) to another serving cell (e.g., associated with either source BS 204 or target BS 406, as shown in FIGS. 10 and 11, for example). That is, in some implementations, the first (or source) cell from which the UE is detaching (or disconnecting) and the second cell to which the UE is attaching (or connecting) may be associated with the same (LEO) satellite, or may be associated with two different (LEO) satellites.

In some implementations, each of the first and second satellites may include a low earth orbiting (LEO) satellite, as described above. In some implementations, the first SMTC may be associated with the serving cell of the first satellite and the second SMTC may be associated with the second cell of the second satellite. Also, in some implementations, the plurality of SMTCs may further include a third SMTC, where the offset value of the first SMTC is the same as the offset value of the third SMTC. As an example, the first and third SMTCs may be the same as the SMTC1 and SMTC2, as described above, for example, with reference to Table 2. As shown in Table 2, SMTC1 and SMTC2 both have the same offset (e.g., in the time domain) and their periodicities are also the same. However, another SMTC in the plurality of SMTCs (e.g., the second SMTC in the above-described implementations) may have an offset in the time domain that is different from the offsets of SMTC 1 and SMTC2. Additionally, the plurality of SMTCs may include more than three SMTCs.

As described above, in some implementations, a difference between the propagation delay periods associated with the first and second satellites, as described in the above example, for receiving and transmitting radio signals may be larger than a threshold, for introducing (or configuring) an additional SMTC (e.g., a third SMTC) that has a different offset from the other SMTCs (e.g., SMTC1 and SMTC2, in Table 2). That is, in some implementations, a UE may be configured to use an SMTC with a different offset in its measurement procedures only if the difference between the propagation delays of a first link (e.g., between the UE and a first cell of a first satellite) and a second link (e.g., between the UE and a second cell of the first satellite or a second satellite) is greater than a threshold (e.g., greater than 2 ms, 3 ms, etc.).

In some implementations, for measurement procedures, such as intra/inter-gNB HO, SCell addition, and CHO, the SFTD measurement configuration may be carried by a RRCReconfiguration message, which may include one or more of the following IEs:

NTN_SFTD_measure IE: may indicate whether the UE is required to perform SFTD measurements for a target cell outside the SMTC configuration (e.g., to measure the SSB outside the timing/duration for the measurements configured by the SMTC configuration). The measurement time and frequency may be controlled by an NTN_SFTD timer and an NTN_SSB_frequency. In some implementations, this IE may be mandatory, for example, when the NW indicates a satellite HO procedure is to be performed.

NTN_RSRP_measure IE: may indicate if the UE is required to perform an RSRP measurement for a target cell outside the SMTC configuration (e.g., to measure the SSB outside the timing/duration for the measurement configured by the SMTC configuration). The measurement time and frequency may be controlled by the NTN_SFTD timer and NTN_SSB_frequency in some implementations.

NTN_cell_search IE: may indicate if the UE is required to perform an initial cell search for a target cell outside the SMTC configuration (e.g., to measure the SSB outside the timing/duration for the measurement configured by the SMTC configuration). The measurement time and frequency may be controlled by the NTN_SFTD timer and NTN_SSB_frequency. Additionally, the UE may follow the same determinations made during the initial cell search in some implementations.

NTN_Cell_To_Measure IE: may be a cell ID that is indicated by the source BS (e.g., a gNB).

NTN_SSB_frequency IE: may indicate the SSB frequency that is associated with the SFTD measurement or the RSRP measurement in some implementations.

NTN_SFTD_timer IE: may include a timer to stop any of the SFTD/RSRP/cell search measurements. Such a timer, in some implementations, may start upon receiving RRC reconfiguration message (e.g., RRCReconfiguration message in which the NTN_SFTD_measure is set to be true), and may stop upon acquiring the SFTD measurement results. The time may also stop performing the related measurements when expired (or at expiry).

It should be noted that when a UE performs the SFTD measurement, the RSRP measurement outside the SMTC, or a cell search due to the above described configuration (e.g., rather than a regular/periodic measurement such as what the UE may setup based on SMTC1), the UE may only need to perform the measurement once following the configured timer (e.g., the NTN_SFTD_timer) for the measurement time (e.g., the UE may only measure when the timer is running), and the configured SSB frequency for the measurement frequency (e.g., the NTN_SSB_frequency), where the configuration is received via an RRC message (e.g., the RRCReconfiguration message).

In some implementations, if the field NTN_SFTD_measure is set to be true, the UE may not perform the SSB measurement based on the SMTC indicated in the RRCReconfiguration message, or based on SMTC 1 or SMTC2, for example, indicated in the measObjectNR, if the SMTC is absent. Instead, the UE may perform the SFTD and/or RSRP measurement, as described above, outside the SMTC according to the configured targeted cell ID, indicated SSB frequency, and the period given by NTN_SFTD_timer.

In some implementations, if the SFTD reporting configuration is provided in the RRCReconfiguration message, the UE may report the measurement results (e.g., of the SFN offset, timing offset, and RSRP) via the RRCReconfigurationComplete message to the target BS. The reported SFTD information may be shared in inter-node RRC messages for mobility control information among the base stations.

In some implementations, the SFTD measurement and reporting may be triggered via a DCI format or via a MAC-CE based on a pre-configuration of an RRC message. The DCI format may be scrambled by a new RNTI with a new field that indicates the activation of a pre-configured SFTD measurement and reporting. The MAC-CE may have a new value of Logical Channel ID field identifies (LCID) or extended LCID (eLCID), and a new field to activate a pre-configured SFTD measurement and reporting.

In some implementations, aperiodic SFTD reporting may be supported, for example, when the UE indicates its capability of handling the aperiodic SFTD reporting feature via an RRC message of UECapabilityInformation. The procedure may be performed by the UE providing a list of SFTD configurations (e.g., via an RRC message). Thereafter, a subset of the list may be triggered via a MAC-CE activation command, and a specific SFTD configuration may be initiated, for example, via a DCI format.

In some implementations, semi-persistent SFTD reporting may be supported when, for example, a UE reports its capability of handling the semi-persistent SFTD reporting feature (e.g., via an RRC message of UECapabilityInformation). The procedure may start by the UE being provided by a list of SFTD configurations (e.g., via an RRC message) and an SFTD configuration may be triggered via a MAC-CE activation command.

In some implementations, the SFTD measurement and reporting may be carried by an IE, such as the measObjectNR, or by a new measurement object, for example, via an RRC message (e.g., the measObjectNTN) that is triggered before the source BS makes an HO decision. The SFTD measurement and reporting may support, at least, RRC_CONNECTED UEs in an intra-frequency scenario with an NR PCell. In some implementations, however an E-UTRA/NR PSCell for such a scenario may not be supported (e.g., since it has not been supported in the 3GPP NR Rel-16).

Figure 14:
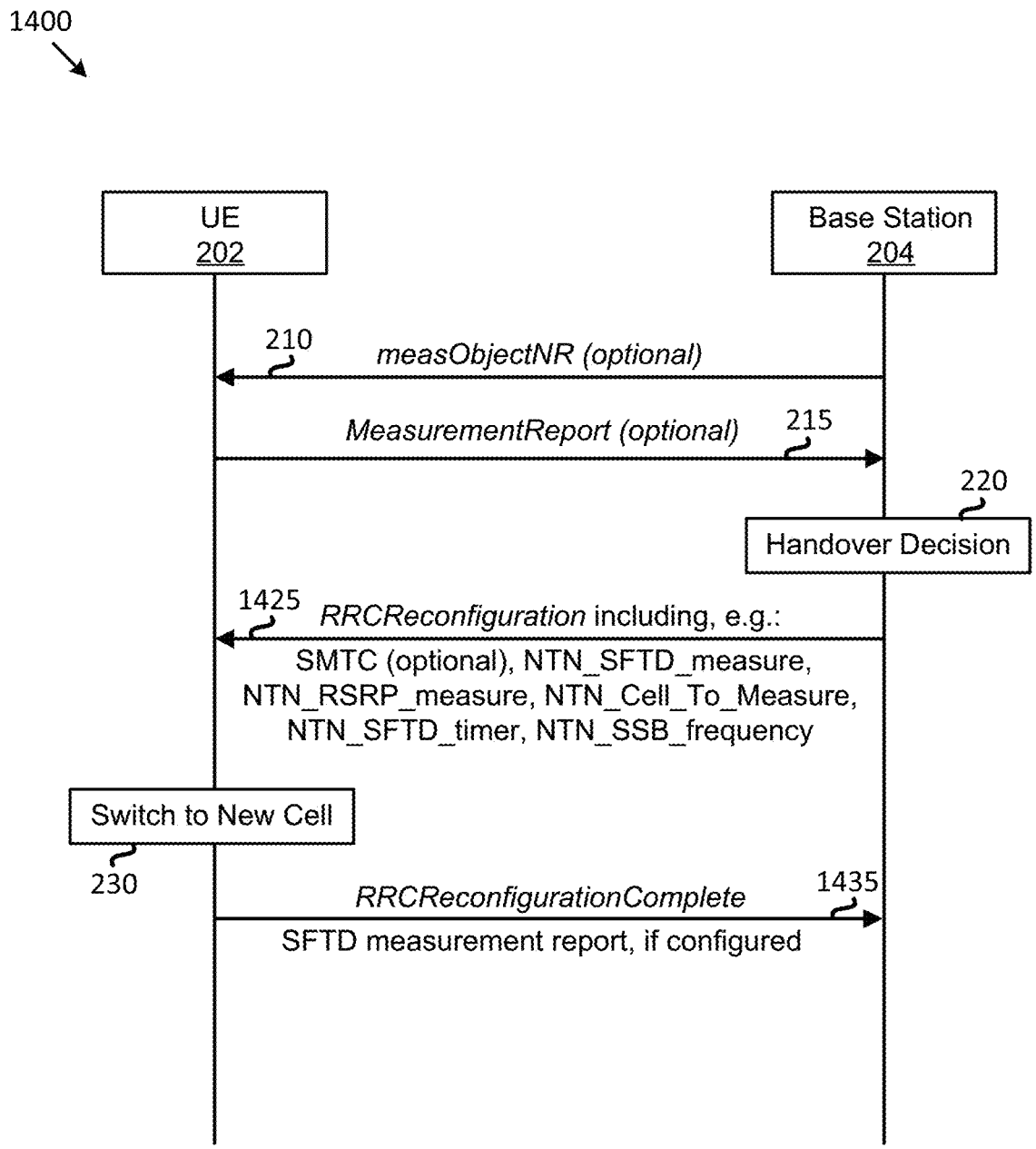
FIG. 14 is a diagram illustrating an enhanced Intra-BS handover procedure performed by a UE which employs new parameters for the SFTD measurement and reporting, according to an example implementation of the present application.

FIG. 14 is a diagram 1400 illustrating an enhanced Intra-BS handover procedure performed by a UE which employs new parameters for the SFTD measurement and reporting, according to an example implementation of the present application. The elements and operations shown in this figure are substantially similar to the elements and operations included in FIG. 2. That is, UE 202 and BS 204 are the same as the UE and BS of FIG. 2, and operations 210, 215, 220, and 230 are also the same as those operations described with reference to FIG. 2. In FIG. 14, however, according to the enhanced HO procedure of some implementations, the RRC reconfiguration message in operation 1425 may carry additional parameters that may be used in determining a new candidate cell to switch too.

The above-described parameters, as shown in FIG. 14, may include, but are not limited to, configuration that may include one or more additional SMTC windows (e.g., in addition to the existing SMTC windows, as described above), NTN_SFTD measurements (e.g., having a parameter NTN_SFTD_measure), NTN RSRP measurements (e.g., having a parameter NTN_RSRP_measure), cells that should be measured (e.g., having a parameter NTN_Cell_To_Measure), an NTN_SFTD_timer (e.g., having a parameter NTN_SFTD_timer), an NTN_SSB_frequency (e.g., having a parameter NTN_SSB_frequency), etc.

After determining to switch to a new selected cell, UE 202 may transmit, in operation 1435, an RRC reconfiguration complete message to BS 204 which may include an SFTD report (e.g., when the UE is configured to provide such a report, for example, within the RRCReconfigurationComplete message).

Figure 15:
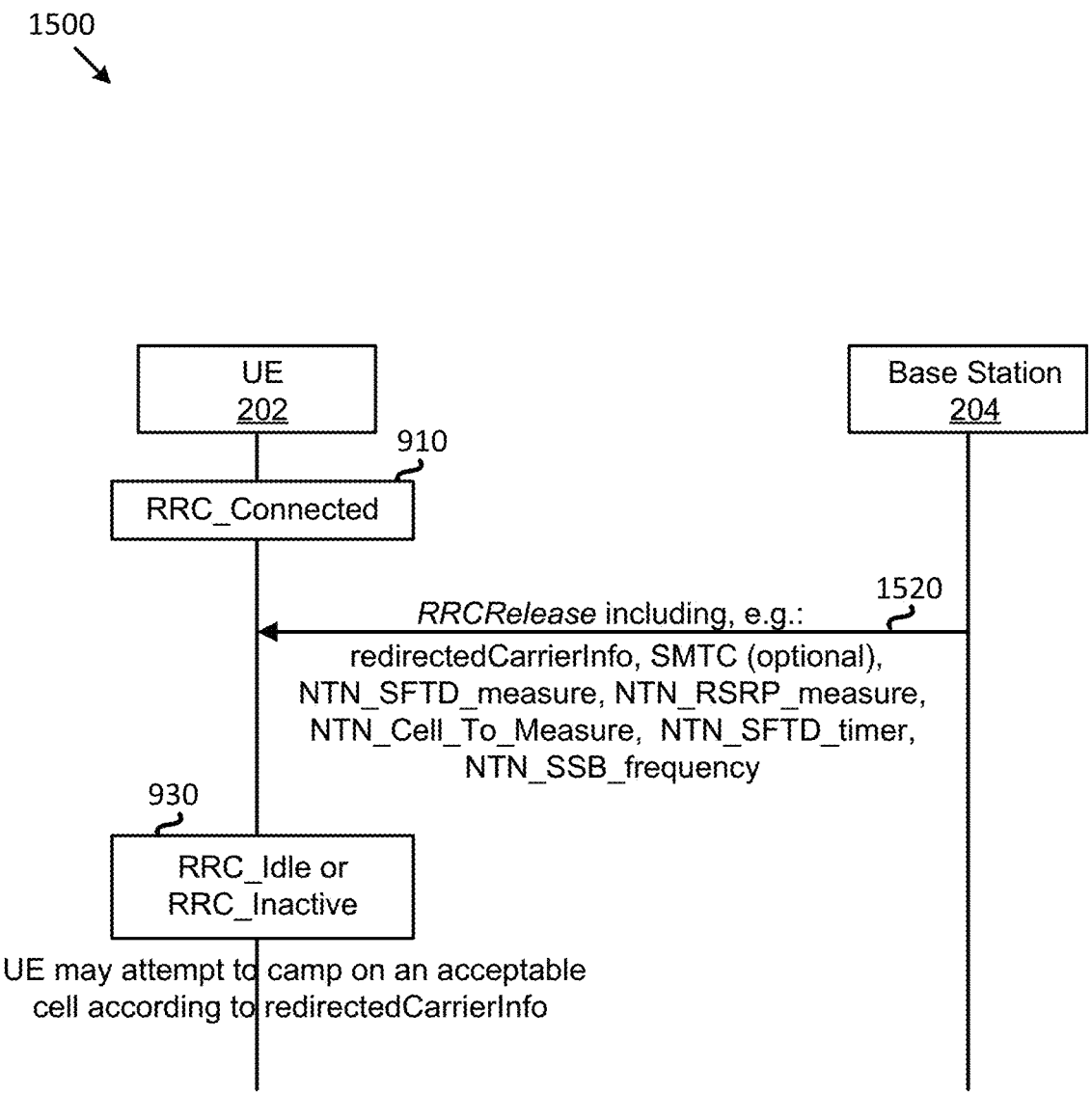
FIG. 15 is a diagram illustrating an enhanced carrier frequency redirection procedure performed by a UE, according to an example implementation of the present application.

FIG. 15 is a diagram 1500 illustrating an enhanced carrier frequency redirection procedure performed by a UE, according to an example implementation of the present application. The elements and operations shown in this figure are substantially similar to the elements and operations included in FIG. 9. That is, UE 202 and BS 204 are the same as the UE and BS of FIG. 9, and operations 910 and 930 are also the same as those operations described with reference to FIG. 9. In FIG. 15, however, the RRC release message in operation 1620 may carry additional parameters that may be used in a carrier frequency redirection.

The above-described parameters, as shown in FIG. 15, may include, but are not limited to, configuration that may include redirection carrier information (e.g., having a parameter redirectCarrierInfo), configuration that may include one or more additional SMTC windows (e.g., in addition to the existing SMTC windows, as described above), NTN_SFTD measurements (e.g., having a parameter NTN_SFTD_measure), NTN RSRP measurements (e.g., having a parameter NTN_RSRP_measure), cells that should be measured (e.g., having a parameter NTN_Cell_To_Measure), an NTN_SFTD_timer (e.g., having a parameter NTN_SFTD_timer), an NTN_SSB_frequency (e.g., having a parameter NTN_SSB_frequency), etc.

In some implementations, if the field of NTN_SFTD_measure is set to be true, the UE may not perform SSB measurements based on the SMTC configuration in the RRCRelease message or perform the corresponding UE's behavior (e.g., when the field SMTC is absent). The UE may perform SFTD and RSRP measurements based on the configuration of a targeted cell ID indicated in the SSB frequency field, and for a period given in NTN_SFTD_timer field. For cell resection, the SFTD measurement configuration may be carried via SIB2 and/or SIB4 in some implementations. The SFTD measurement configuration may provide the parameters NTN_SSB_frequency and NTN_SFTD_timer for potential SSB transmissions. In case that the UE is provided with both SFTD and SMTC, the UE may prioritize SMTC (e.g., if configured) in some implementations. If the SFTD is provided, but the SMTC is absent, in some implementations, the UE may use the SFTD configuration.

Figure 16:
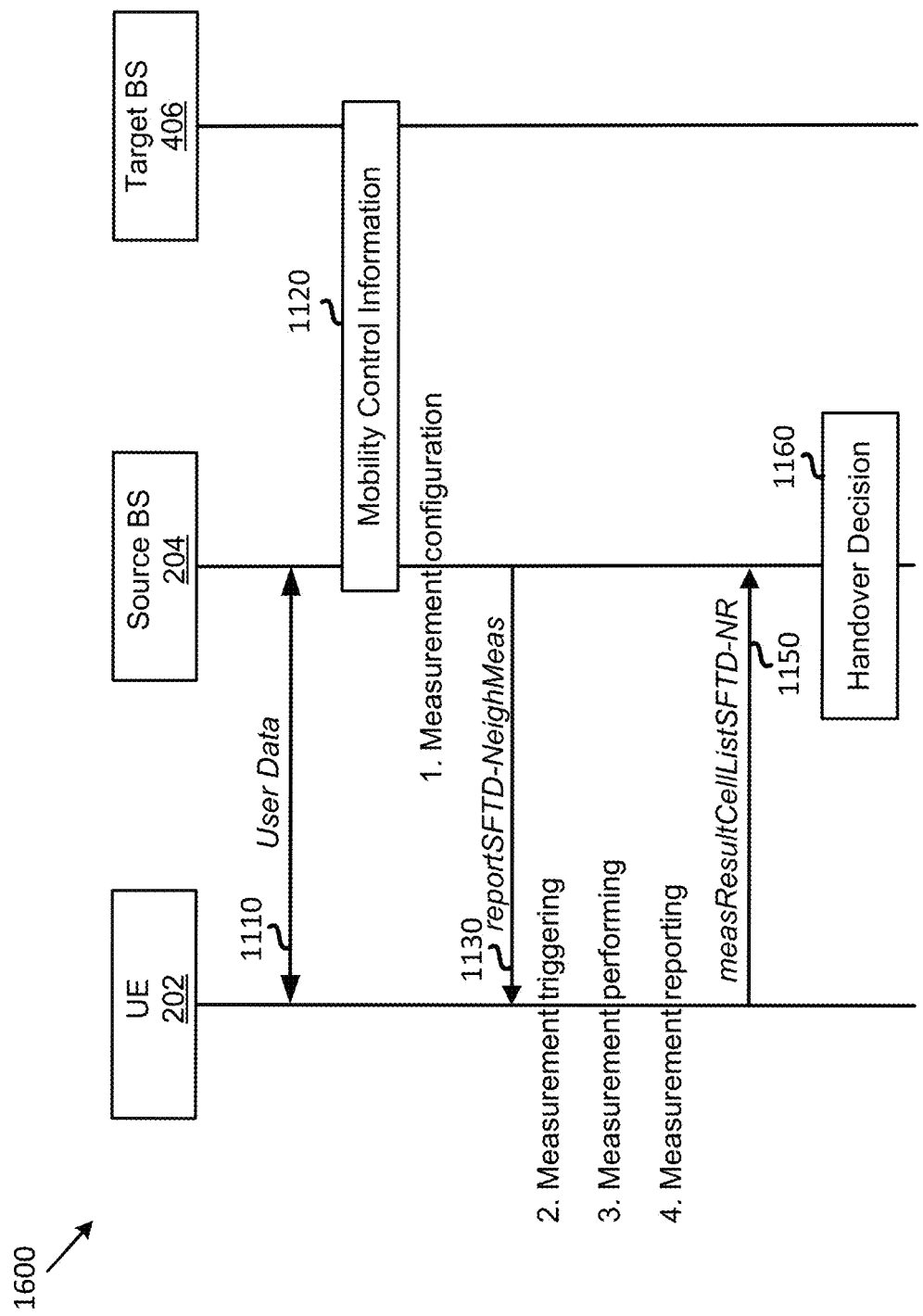
FIG. 16 is a diagram illustrating performing an enhanced HO procedure using enhanced SFTD measurements, according to an example implementation of the present application.

FIG. 16 is a diagram 1600 illustrating performing an enhanced HO procedure using enhanced SFTD measurements, according to an example implementation of the present application. The elements and operations shown in this figure are substantially similar to the elements and operations included in FIG. 11. That is, UE 202, source BS 204, and target BS 406 are the same as the UE, and source and target base stations of FIG. 11, and operations 1110, 1120, 1130, 1150, and 1160 are also the same as those operations described with reference to FIG. 11. In FIG. 16, however, to enhance the HO decision making procedure, the NW may have the UE initiate an enhanced SFTD measurement to obtain sufficient HO information from the UE.

Also, as shown in FIG. 16, the inter-node RRC messages between the source and target base stations may include UE-specific information related to the serving and the target NTN cells that are used for the HO decision making procedure. Such information may include, but is not limited to, satellite information (e.g., satellite ID, satellite orbit, satellite payload types, satellite ephemeris, satellite elevation angle to the ground), UE information (e.g., the propagation delay, UE location, UE type, such as handheld, VSAT, or vehicle-mounted device), UL Doppler frequency pre-compensation, etc.

Measurement configuration and reporting configuration may be carried via the measConfig parameter. These configurations may include reportSFTD-NTN, which is a new indication to associate with a new NTN-SFTD-timer that allows the UE to perform the SSB measurements longer than a default timer (e.g., T322) and other NTN-related parameters.

Measurement triggering (e.g., that may be carried via the measConfig) may include different parameters, such as SatelliteForWhichToReportSFTD, cellsForWhichToReportSFTD, NTN-SFTD-timer, etc. The SatelliteForWhichToReportSFTD may include satellite ID(s) that may be associated with physical cell IDs for the UE to find the target SSB. The cellsForWhichToReportSFTD may include physical cell IDs that are indicated by the Source BS. If no target cell ID is provided by the NW, the UE may consider up to three strongest NR neighboring cells by default in some implementations. The strongest NR neighboring cells may be identified based on information, such as the RSRP, propagation delay estimation on the target cells, Doppler frequency shift estimation on the target cells, elevation angles on the target cells, or they may be identified based on satellite ephemeris associated with the satellite IDs and physical cell IDs.

The NTN-SFTD-timer may include a new SFTD timer that is used to stop SFTD measurement. This timer may start upon receiving the measConfig parameter including the reportConfigNR with the purpose set to be reportSFTD and reportSFTD-NTN set to true. The timer may stop upon acquiring the SFTD measurement results or upon receiving measConfig that includes removal of the reportConfig. At the timer's expiration the UE may initiate the measurement reporting procedure and stop performing the related measurements in some implementations.

Measurement performing carried via the measConfig may include different parameters, such as the drx-SFTD-NTN parameter, reportRSRP, reportGNSS, report elevation angle, etc. the drx-SFTD-NTN parameter may include the SFTD using available DRX idle periods. If the drx-SFTD-NTN is provided, the UE may perform SFTD measurements between the PCell and the NR neighboring cell(s) detected based on parameters in the associated measObject (e.g., using the available DRX idle periods). Conversely, when the drx-SFTD-NTN is absent, the UE may perform SFTD measurements between the PCell and the NR neighboring cell(s) detected based on parameters in the associated measObject.

If the drx-SFTD-NTN is provided and the measObject associated with the measId concerns FR1, the UE may start NTN-SFTD timer with the timer value set to be a specific period (e.g., 2 seconds, 5 seconds, etc.) for the measId. On the other hand, If the drx-SFTD-NTN is provided and the measObject associated with this measId concerns FR2, the UE may start an NTN-SFTD timer with a value that is set to be a specific number (e.g., 1 second, 3 seconds, etc.) for the measId. Additionally, if the drx-SFTD-NTN is provided and the measObject associated with this measId concerns the NTN, the UE may start the NTN-SFTD timer with the timer value set to be yet another specific number of seconds for the measId.

The reportRSRP parameter may indicate to the UE to perform the RSRP measurements based on the SSB for the NR neighboring cell(s) that are detected based on the parameters in the associated measObject. The reportGNSS parameter may indicate to the UE to perform location measurements. The report_elevation_angle parameter may indicate to the UE to measure elevation angles of the target cells.

Measurement reporting carried via the measConfig may include different parameters, such as the physCellId, satCellId, sfn-OffsetResult, frameBoundaryOffsetResult, rsrp-Result, GNSS-Result, Elevation-Result, etc.

The physCellId parameter may include resulted cell IDs. The satCellId parameter may include the resulted satellite IDs, if configured. The sfn-OffsetResult parameter may include the resulted SFN difference between the NR PCell and the NR cell. The frameBoundaryOffsetResult parameter may include the resulted frame boundary difference. The rsrp-Result parameter may include the resulted RSRP, the GNSS-Result parameter may include the resulted GNSS, and the Elevation-Result parameter may include the resulted elevation angles. Additionally, a measResultCellListSFTD-NTN parameter may be used to carry the measurement results for the MAC and Physical layers to be transmitted to the NW.

In some implementations, when an SFTD report is not required for the BS, the NW may indicate to the UE to measure the SSB outside the SMTC. For intra/inter-gNB HO, SCell addition, and CHO procedures, an outside-SMTC SSB measurement indication may be carried via an RRC reconfiguration message (e.g., RRCReconfiguration) which may include information, such as follows:

NTN_outside_SMTC: to indicate if the UE is required to perform the SSB measurements outside the SMTC.

NTN_cell_search: to indicate whether the UE is required to perform an initial cell search for a target cell outside the SMTC configuration. The UE may follow the same assumptions as the initial cell search.

NTN_RSRP_measure: to indicate if the UE is required to perform the RSRP measurements for a target cell outside the SMTC configuration.

NTN_Cell_To_Measure: to indicate a target cell ID indicated by the source gNB.

NTN_SSB_frequency: to indicate the SSB frequency associated with the SFTD or the RSRP measurement.

NTN_outside_SMTC timer: to indicate a timer to stop the SSB measurement outside the SMTC, which may start upon receiving the RRCReconfiguration (e.g., having the NTN_outside_SMTC set to be true), may stop upon acquiring the SSB measurement results. The UE may stop performing the related measurements at expiry of such a timer.

For EMR and carrier frequency redirection, in some implementations, an outside-SMTC SSB measurement indication may be carried (e.g., via the RRC message RRCRelease) and may including parameters, such as the NTN_cell_search, NTN_RSRP_measure, NTN_Cell_To_Measure, NTN_SSB_frequency, and NTN_SFTD_timer.

In some implementations, the NW may provide an indication, e.g., NTN_out_SMTC, to allow a UE to assume that the SSB periodicity is a specific value (e.g., 5 ms) in a particular frequency if the SMTC is absent (e.g., in the RRCReconfiguration message). For example, the UE may determine the SMTC configuration based on, for example, when the SMTC is configured, then the UE may measure the SSB based on the configured SMTC, otherwise, if the SMTC is absent and the NTN_out_SMTC is provided, then the UE may measure the SSB assuming that the SSB periodicity is a specific value (e.g., 5 ms), otherwise (e.g., when the SMTC is absent and the NTN_out_SMTC is absent), the UE may use SMTC1 or SMTC2 configured before receiving the RRCReconfiguration message.

In case that UE receives both SMTC and NTN_out_SMTC, the UE may ignore the SMTC configuration and measure the SSB assuming that the SSB periodicity is a specific value (e.g., 5 ms). In some other implementations, the UE may not be expected to receive both the SMTC and the NTN_out_SMTC. In some implementations, the NTN_out_SMTC parameter may be a one-bit field, which may be either present (or provided) or absent.

Figure 17:
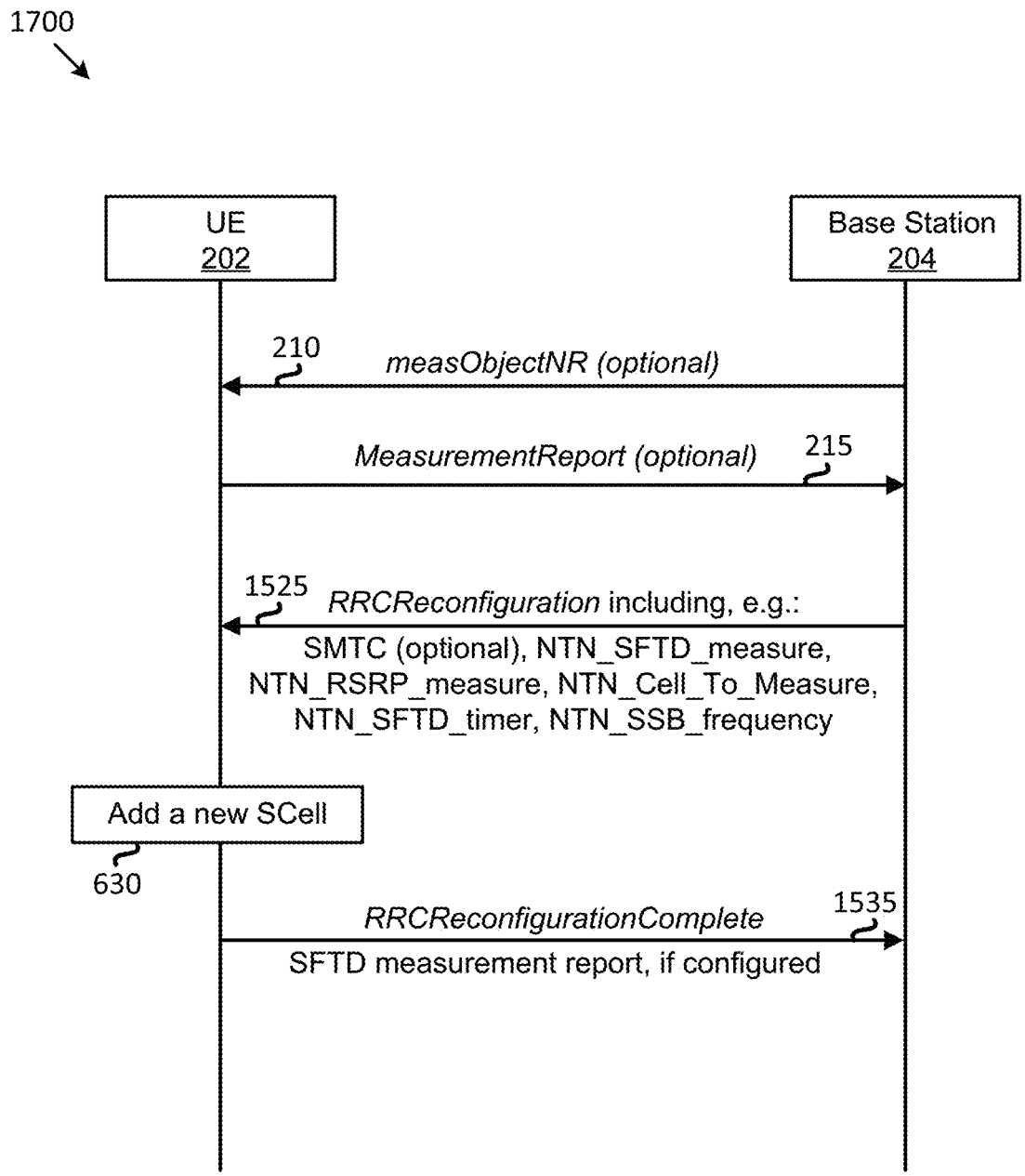
FIG. 17 is a diagram illustrating an SCell addition procedure performed by a UE, according to one example implementation of the present application.

FIG. 17 is a diagram 1700 illustrating an SCell addition procedure performed by a UE, according to one example implementation of the present application. The elements and operations shown in this figure are substantially similar to the elements and operations included in FIGS. 2 and 6. That is, UE 202 and BS 204 are the same as the UE and BS of FIGS. 2 and 6, and operations 210, 225, and 630 are also the same as those operations described with reference to FIGS. 2 and 6. In FIG. 17, however, to enhance the SCell addition procedure, the UE may use the illustrated parameters as assistant information from the NW to find the SSB occasions (e.g., of a target secondary cell). Operations 1524 and 1535 are the same as those described above with reference to FIG. 15.

As described above, in addition to SMTC1 and SMTC2, the IE MeasObjectNR may include an additional list of SMTC configurations that may be denoted by a parameter, such as the NTN-SMTC3-list. The NTN-SMTC3-list may include the following:

NTN-SMTC3-Id: an identity of the NTN-SMTC3 configuration. The NTN-SMTC3-list may have at least one ID (e.g., when configured).

NTN-SMTC3: a new SMTC may be used to configure measurement timing configurations (e.g., the timing occasions at which the UE may measure the SSBs for an NTN).

PeriodicityAndOffset: the periodicity and offset of the measurement window in which to receive the SSB occasions. The periodicity and offset may be given in number of subframes in some embodiments.

Duration: the duration of the measurement window in which to receive the SSB occasions. It may be given in number of subframes as well.

pci-List: the physical cell IDs that are known to follow the SMTC, and used for the NTN cell discovery.

ssb-ToMeasure: the set of SS blocks to be measured within the SMTC measurement duration. The first/leftmost bit may correspond to the SS block index 0, the second bit may correspond to the SS block index 1, and so on. A value of 0 in the bitmap may indicate that the corresponding SS block may not be measured, while a value of 1 may indicate that the corresponding SS block may be measured. When this field is not configured, the UE may measure all the SS blocks.

In some implementations, when the NTN-SMTC3-list field may be present, for cells that are indicated in the pci-List in each NTN-SMTC3 of the list in the same MeasObjectNR, the UE may setup an additional SMTC following the received parameters, e.g., periodicityAndOffset (using the same condition as SMTC1 to identify the SFN and the subframe for SMTC occasion), duration, and ssb-ToMeasure.

In some implementations, the NTN-SMTC3 field may include NTN related information, such as satellite IDs (e.g., a satellite ID may contain a list of cell IDs to imply these cells are provided via the same satellite), cell-specific UL or DL Doppler shift information (e.g., a satellite may pre-compensate DL Doppler shift and post-compensate UL Doppler shift based on satellite ephemeris and the service area; this information may broadcast to UE to facilitate cell searching or random access procedures), cell-specific propagation delay or cell-specific timing advanced value, satellite elevation angles, satellite ephemeris, gateway location, etc.

In some implementations, the NTN-SMTC3 field may contain propagation delay variation rate information. The UE may follow the delay variation rate information to refine the correct SMTC window corresponding to the propagation delay change to a target cell. This information may also be used by the UE to determine whether this SMTC window is valid or not. If the UE determines that the SMTC window is invalid, the UE may skip the measurements on the SMTC or the UE may measure outside the SMTC window. The delay variation rate information may be associated with a target cell ID or a target satellite ID. If the delay variation rate information is provided, the PeriodicityAndOffset may provide dynamic offset that may move with time.

In some implementations, the NTN-SMTC3 field may contain a longer duration than 5 subframes. In some such implementations, if the duration value of NTN-SMTC3 field is configured to be larger than 5 subframes, then the UE may not be expected to be configured periodicity with the value of 5 subframes or any value smaller than the duration. When the UE receives a configuration showing the duration value is smaller than the periodicity value, the UE may identify the configuration to have error and may ignore the measurement configuration.

In some implementations, the NTN-SMTC3 field may be configured conditionally, for example, upon an NTN related IE. For example, the NTN-SMTC3 field may be mandatory when a serving cell is identified as an NTN cell, or a target cell is identified as an NTN cell. Some other NTN related IEs may include the NTN PLMN IDs, an explicit indication of a satellite ID, or an NTN-RNTI CRC.

In some implementations, for all SSB based measurements, there is at most one measurement object with the same ssbFrequency. In this measurement object, if the NTN-SMTC3 field is configured, there may be three (or more) SMTC configurations (e.g., SMTC1, SMTC2, and NTN-SMTC3) to provide specific information applicable to the SSB intra/inter-frequency measurements and/or to the CSI-RS intra/inter-frequency measurements.

In some implementations, to adopt more than one SMTC window per SSB frequency, the measurement gap configuration may need to be enhanced. This is because the UE (e.g., based on 3GPP Rel-16 NR) may be configured with a list of measurement objects, and only one measurement gap. This measurement gap may be a period that allows the UE to stop some transmissions (or receptions) to perform the required measurements. When the NTN-SMTC3 field is configured, there may be a need for the UE to set up an additional measurement gap to perform the configured measurement.

In some implementations, the NTN-SMTC3 filed included in any measurement object with the same ssbFrequency may have the same value.

In some implementations, a new measurement gap (e.g., NTN_MeasGapConfig_2) may be carried by an RRC message that contains MeasConfig and measGapConfig. This new IE may be used for additional measurement gap configuration, including measurement gap configuration that applies to FR1 and FR2 or all frequency, the gap offset of the gap pattern, the measurement gap length, the measurement gap repetition period of the measurement gap, the measurement gap timing advance, etc.

Figure 18:
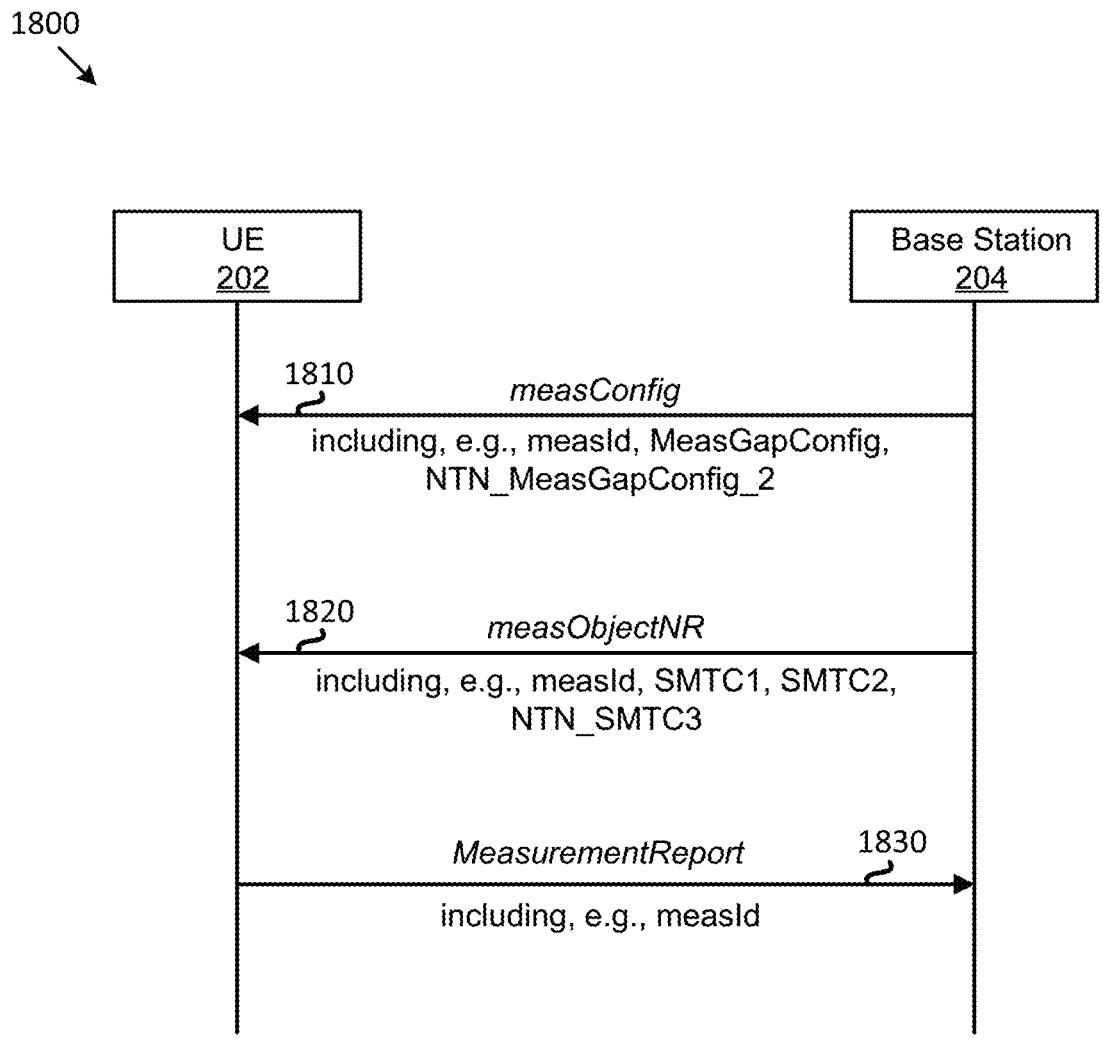
FIG. 18 is a diagram illustrating a measurement procedure employing a new SMTC and measurement gap, according to an example implementation of the present application.

FIG. 18 is a diagram 1800 illustrating a measurement procedure employing a new SMTC and measurement gap, according to an example implementation of the present application. In the figure, BS 204 may provide, in operation 1810, the measConfig via an RRC message. The measurement configuration may include a list of measurement identities, e.g., measId, that is associated with a measurement object, e.g., measObjectNR, and a measurement report, e.g., MeasurementReport. This design provides at most two independent periods of measurement gap per UE in some implementations.

BS 204 may also provide, in operation 1820, the measObjectNR (e.g., via an RRC message). The measurement object NR may include the list of measurement identities, e.g., measId, that is associated with SMTC1, SMTC2, and NTN SMTC3. In response, UE 202 may provide to BS 204 measurement report, in operation 1830, that may include the list of measurement identities, e.g., measId.

In some implementations, a LEO satellite HO procedure may be initiated periodically (e.g., every 20 minutes according to TR 38.811), depending on the satellite deployment. This may imply that some of the introduced NTN features may be especially useful for satellite HO procedures.

In some implementations, the NW may indicate to the UE the timing for a satellite HO procedure, or a procedure that is involved with a satellite HO. This indication may be sent via an RRC message, such as an RRCReconfiguration. Some NTN features may be conditional upon a new indicator (e.g., NTN satellite HO) that is used to differentiate whether the procedures (e.g., inter-gNB HO procedure) are involved with a satellite HO. For example, the UE may be provided with two different sets of RRC configurations, where one set is used when the indication is provided, and another set is used when the indication is absent.

In some implementations, the NTN satellite HO field may be transmitted by the BS to the UE (e.g., via an RRC messages, MAC-CE, or DCI formats). It can also be associated with the NTN-RNTI or NTN-LCID.

In some implementations, the NW may indicate a satellite HO to enable an asynchronous Dual Active Protocol Stack (DAPS) handover. This may allow the UE to have longer interruption time, and lager UL transmission or DL receiving timing difference between the cells.

In some implementations, the UE may choose a default UE behavior when some configuration fields are absent. These default UE behaviors may be different when the NTN_satellite_HO field is provided.

In some implementations, the NTN_satellite_HO field may be used to enable the CHO or measurement reporting with other sorts of triggering conditions rather than measurement-based triggering. Some examples follow.

Location-based triggering: may be an additional triggering conditions based on the UE and satellite locations. The location triggering condition may be expressed as a distance between the UE and the satellite.

Timer-based triggering: several triggering conditions considering the time of a region may be considered. This may be based on the UTC or a timer-based solution.

Timing advance based triggering: additional triggering conditions based on timing advance value associated with the target cell.

Elevation-angle based triggering: additional triggering conditions based on elevation angles of source and target cells.

In some implementations, the NW may provide the SSB periodicity/offset/duration configuration of the target cells (e.g., the SMTC field in the RRCReconfiguration message) for the inter-gNB CHO procedure. However, one SMTC may not cover the SSBs associated with multiple target cell candidates.

To some such implementations, a new IE (e.g., referred to as the NTN-SMTC) may be needed. The NTN-SMTC IE may provide additional information applicable for the SSB/CSI-RS intra/inter-frequency measurements. A UE may be provided with a list of more than one SMTC configuration for the target cell candidates, denoted by NTN-SMTC-list. Each NTN-SMTC element may include different information, such as the periodicity, offset, duration, a cell ID, and the SSB patterns. The NTN-SMTC IE may be conditionally configured with SMTC, e.g., it is absent when SMTC is absent.

In some implementations, NTN-SMTC may also provide the target satellite and the serving satellite information, e.g., satellite ephemeris, or a satellite ID if the UE has stored some satellite ephemeris. It may also provide a ground-based gateway location, e.g., GNSS information, that connects to the serving/target gNB and the serving/target satellite. It may also provide a reference value for the propagation delay difference caused by a satellite HO. The reference value may be calculated by the NW based on the propagation delay caused by the links between the gateway(s) and satellites associated with the target cell and the serving cell.

In some implementations, NTN-SMTC is delivered in system information (e.g., for inter-frequency cell reselection procedure) or UE-specific RRC signaling (e.g., RRC Release message for redirecting the UE to another frequency carrier). In addition, the UE may also obtain the system information through DL-RRC signaling. In SIB2 and SIB4, this NTN-SMTC may be present with the legacy SMTC to support SSB measurements with different propagation delay differences.

Figure 19:
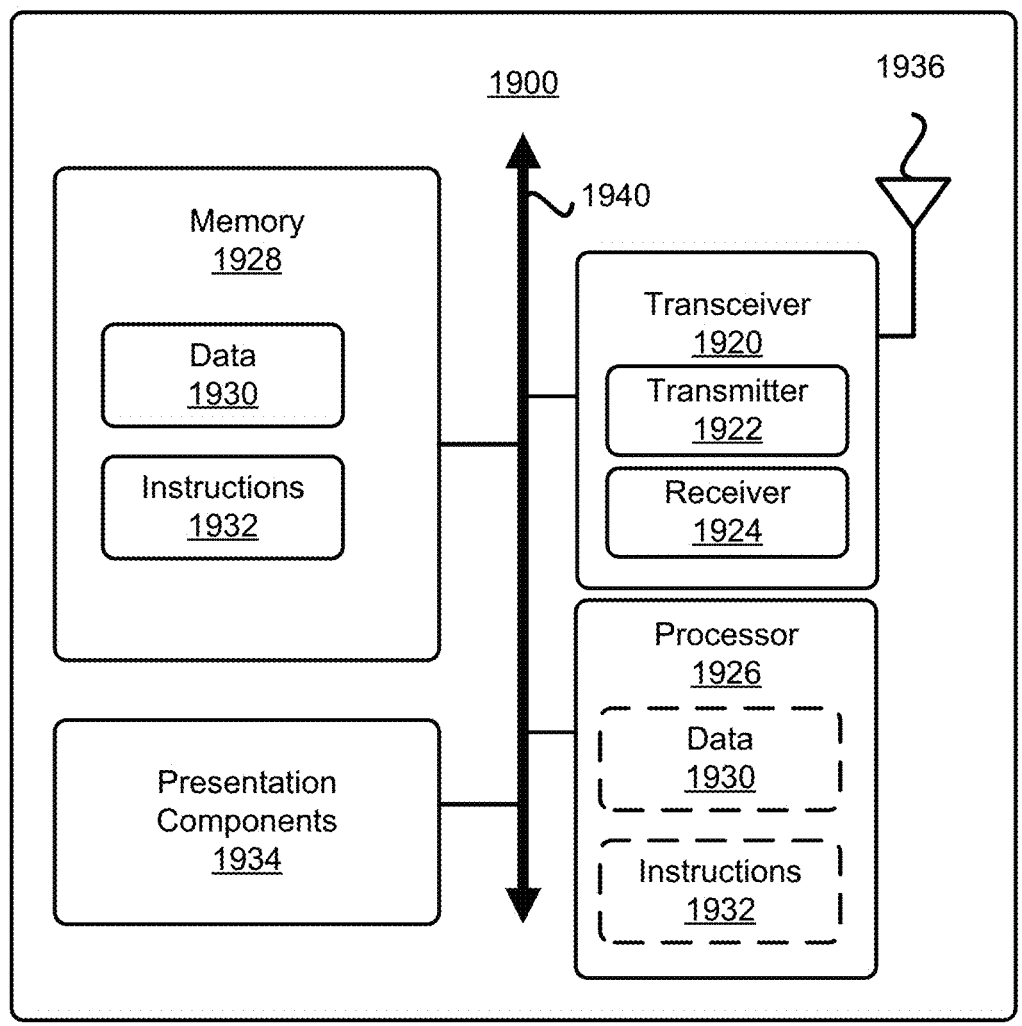
FIG. 19 illustrates a block diagram of a node for wireless communication, according to one example implementation of the present application.

FIG. 19 illustrates a block diagram of a node for wireless communication, according to one example implementation of the present application. As shown in FIG. 19, node 1900 may include transceiver 1920, processor 1926, memory 1928, one or more presentation components 1934, and at least one antenna 1936. Node 1900 may also include a Radio Frequency (RF) spectrum band module, a base station communications module, a network communications module, and a system communications management module, input/output (I/O) ports, I/O components, and power supply (not explicitly shown in FIG. 19). Each of these components may be in communication with each other, directly or indirectly, over one or more buses 1940.

Transceiver 1920 having transmitter 1922 and receiver 1924 may be configured to transmit and/or receive time and/or frequency resource partitioning information. In some implementations, transceiver 1920 may be configured to transmit in different types of subframes and slots including, but not limited to, usable, non-usable and flexibly usable subframes and slot formats. Transceiver 1920 may be configured to receive data and control signaling.

Node 1900 may include a variety of computer-readable media. Computer-readable media can be any available media that can be accessed by node 1900 and include both volatile and non-volatile media, removable and non-removable media. By way of example, and not limitation, computer-readable media may comprise computer storage media and communication media. Computer storage media include both volatile and non-volatile, removable and non-removable media implemented in any method or technology for storage of information such as computer-readable instructions, data structures, program modules or other data.

Computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media do not comprise a propagated data signal. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer-readable media.

Memory 1928 may include computer-storage media in the form of volatile and/or non-volatile memory. Memory 1928 may be removable, non-removable, or a combination thereof. Exemplary memory includes solid-state memory, hard drives, optical-disc drives, etc. As illustrated in FIG. 19, memory 1928 may store computer-readable, computer-executable instructions 1932 (e.g., software codes) that are configured to, when executed, cause processor 1926 to perform various functions described herein, for example, with reference to FIGS. 1 through 19. Alternatively, instructions 1932 may not be directly executable by processor 1926 but be configured to cause node 1900 (e.g., when compiled and executed) to perform various functions described herein.

Processor 1926 may include an intelligent hardware device, for example, a central processing unit (CPU), a microcontroller, an ASIC, etc. Processor 1926 may include memory. Processor 1926 may process data 1930 and instructions 1932 received from memory 1928, and information through transceiver 1920, the base band communications module, and/or the network communications module. Processor 1926 may also process information to be sent to transceiver 1920 for transmission through antenna 1936, to the network communications module for transmission to a core network.

One or more presentation components 1934 presents data indications to a person or other device. For example, one or more presentation components 1934 include a display device, speaker, printing component, vibrating component, etc.

From the above description it is manifest that various techniques can be used for implementing the concepts described in the present application without departing from the scope of those concepts. Moreover, while the concepts have been described with specific reference to certain implementations, a person of ordinary skill in the art may recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for a user equipment (UE) connected to a serving cell associated with a first satellite, the method comprising:
receiving, at the UE, a measurement configuration comprising a plurality of synchronization signal block (SSB) measurement timing configurations (SMTCs), wherein:
a first SMTC in the plurality of SMTCs has a first set of parameters and a second SMTC of the plurality of SMTCs has a second set of parameters,
the first SMTC and the second SMTC are associated with a non-terrestrial network (NTN), and
the first and second sets of parameters have at least one parameter in common and one different parameter;
receiving a signal to perform a measurement procedure for a second cell associated with a second satellite; and
performing the measurement procedure based on the received plurality of SMTCs, wherein:
each of the first and second sets of parameters comprises a same duration of time that indicates an SMTC window within which at least one of an SSB or a channel state information-reference signal (CSI-RS) is detectable by the UE to perform the measurement procedure, and each of the first and second sets of parameters further comprises a different offset value.

2. The method of claim 1, wherein receiving the measurement configuration comprises receiving the measurement configuration from a base station through the serving cell.

3. The method of claim 1, wherein the measurement procedure is performed for a handover procedure to move from the serving cell to the second cell.

4. The method of claim 1, wherein the first and second SMTCs are associated with the same frequency.

5. The method of claim 1, wherein the first satellite is different than the second satellite.

6. The method of claim 1, wherein the first satellite is the same as the second satellite.

7. The method of claim 1, wherein the first SMTC is associated with the serving cell of the first satellite and the second SMTC is associated with the second cell of the second satellite.

8. The method of claim 1, wherein:
each of the first and second sets of parameters further comprises a periodicity value that indicates a periodicity of the SMTC window, and
the periodicity value in the first set of parameters is the same as the periodicity value in the second set of parameters.

9. A user equipment (UE) connected to a serving cell associated with a first satellite, the UE comprising:
one or more non-transitory computer-readable media storing computer-executable instructions for performing measurements; and
at least one processor coupled to the one or more non-transitory computer-readable media, and configured to execute the computer-executable instructions to:
receive a measurement configuration comprising a plurality of synchronization signal block (SSB) measurement timing configurations (SMTCs), wherein:
a first SMTC in the plurality of SMTCs has a first set of parameters and a second SMTC of the plurality of SMTCs has a second set of parameters,
the first SMTC and the second SMTC are associated with a non-terrestrial network (NTN), and
the first and second sets of parameters have at least one parameter in common and one different parameter;
receive a signal to perform a measurement procedure for a second cell associated with a second satellite; and
perform the measurement procedure based on the received plurality of SMTCs, wherein:
each of the first and second sets of parameters comprises a same duration of time that indicates an SMTC window within which at least one of an SSB or channel state information-reference signal (CSI-RS) is detectable by the UE to perform the measurement procedure, and
each of the first and second sets of parameters further comprises a different offset value.

10. The UE of claim 9, wherein receiving the measurement configuration comprises receiving the measurement configuration from a base station through the serving cell.

11. The UE of claim 9, wherein the measurement procedure is performed for a handover procedure to move from the serving cell to the second cell.

12. The UE of claim 9, wherein the first and second SMTCs are associated with the same frequency.

13. The UE of claim 9, wherein the first satellite is different than the second satellite.

14. The UE of claim 9, wherein the first satellite is the same as the second satellite.

15. The UE of claim 9, wherein the first SMTC is associated with the serving cell of the first satellite and the second SMTC is associated with the second cell of the second satellite.

16. The UE of claim 9, wherein:
each of the first and second sets of parameters further comprises a periodicity value that indicates a periodicity of the SMTC window, and
the periodicity value in the first set of parameters is the same as the periodicity value in the second set of parameters.

* * * * *